United States Patent
Fortin

(10) Patent No.: US 11,951,816 B2
(45) Date of Patent: Apr. 9, 2024

(54) VEHICLE DOOR WITH CARRIER MODULE HAVING SUSTAINABLE CARRIER

(71) Applicant: MAGNA CLOSURES INC., Newmarket (CA)

(72) Inventor: Raymond Edward Fortin, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 482 days.

(21) Appl. No.: 17/216,791

(22) Filed: Mar. 30, 2021

(65) Prior Publication Data

US 2021/0300161 A1  Sep. 30, 2021

Related U.S. Application Data

(60) Provisional application No. 63/090,939, filed on Oct. 13, 2020, provisional application No. 63/003,072, filed on Mar. 31, 2020.

(51) Int. Cl.
| | |
|---|---|
| *B60J 5/04* | (2006.01) |
| *B32B 5/02* | (2006.01) |
| *B32B 5/26* | (2006.01) |
| *B32B 27/12* | (2006.01) |
| *B32B 27/32* | (2006.01) |

(52) U.S. Cl.
CPC ............. *B60J 5/0413* (2013.01); *B32B 5/028* (2013.01); *B32B 5/26* (2013.01); *B32B 27/12* (2013.01); *B32B 27/32* (2013.01); *B60J 5/0416* (2013.01); *B60J 5/0463* (2013.01); *B60J 5/0481* (2013.01); *B60J 5/0484* (2013.01); *B32B 2255/26* (2013.01); *B32B 2262/108* (2013.01); *B32B 2605/00* (2013.01)

(58) Field of Classification Search
CPC . B60J 5/041; B60J 7/048; B60J 5/0484; B60J 5/0418; B60J 5/0438; B60J 5/0422; B60J 5/0416; B32B 27/12; B32B 29/02; B32B 5/026; B32B 5/024; B32B 2255/02; B32B 2260/021; B32B 19/06
USPC ...................................................... 296/146.7
See application file for complete search history.

(56) References Cited

U.S. PATENT DOCUMENTS 4,418,031 A * 11/1983 Doerer .................. D04H 1/558
428/326
6,543,839 B1  4/2003 Gfrerrer et al.
(Continued)

FOREIGN PATENT DOCUMENTS

AU  2005307738 A1 *  6/2007  .......... B29C 70/086
CN  104626690 A  *  5/2015
(Continued)

OTHER PUBLICATIONS

BASF Acrodur® DS 3515 Product Specs https://protect-us.mimecast.com/s/0Ws3CjR69gFZNJvvhWeFsk?domain=construction.basf.us.

*Primary Examiner* — Dennis H Pedder
(74) *Attorney, Agent, or Firm* — Dickinson Wright PLLC

(57) ABSTRACT

A carrier of a carrier module for a motor vehicle door assembly and method of manufacture thereof is provided. The carrier has a body with opposite wet and dry sides bounded by an outer periphery configured for attachment to an inner panel of the motor vehicle door assembly. The body is made of a recyclable, environmentally sustainable natural fibrous material.

18 Claims, 17 Drawing Sheets

(56) References Cited

U.S. PATENT DOCUMENTS

| | | | |
|---|---|---|---|
| 7,059,658 B2 * | 6/2006 | Ziegler | B32B 9/02 |
| | | | 296/146.7 |
| 8,020,919 B2 | 9/2011 | Lin et al. | |
| 8,568,853 B2 | 10/2013 | Raghavendran et al. | |
| 8,770,637 B2 | 7/2014 | Hess et al. | |
| 9,010,840 B2 * | 4/2015 | Brymerski | B60J 5/0452 |
| | | | 296/146.7 |
| 9,283,702 B2 * | 3/2016 | Reese | B60J 5/0481 |
| 10,343,316 B2 | 7/2019 | Dassen et al. | |
| 10,385,182 B2 | 8/2019 | Son et al. | |
| 10,723,207 B2 * | 7/2020 | Fischer | B60J 5/0455 |
| 2003/0008581 A1 | 1/2003 | Tilton et al. | |
| 2003/0213544 A1 | 11/2003 | Hesch | |
| 2006/0264554 A1 * | 11/2006 | Lustiger | B29B 7/90 |
| | | | 524/451 |
| 2011/0101731 A1 | 5/2011 | Legler et al. | |
| 2011/0274897 A1 | 11/2011 | Dauner et al. | |
| 2012/0261221 A1 | 10/2012 | Wuest et al. | |
| 2014/0361576 A1 * | 12/2014 | Storgato | B60J 5/045 |
| | | | 296/146.6 |
| 2016/0107339 A1 | 4/2016 | Ong | |
| 2016/0136870 A1 * | 5/2016 | Thienel | B29C 45/14221 |
| | | | 428/300.7 |
| 2017/0137067 A1 | 5/2017 | Wolf et al. | |
| 2019/0048962 A1 | 2/2019 | Wuest et al. | |
| 2020/0001691 A1 | 1/2020 | Grella | |

FOREIGN PATENT DOCUMENTS

| | | | | |
|---|---|---|---|---|
| CN | 105377523 A | | 3/2016 | |
| CN | 105916687 A | * | 8/2016 | ............ B29C 43/30 |
| CN | 105916687 B | * | 5/2018 | ............ B29C 43/30 |
| CN | 110654208 A | | 1/2020 | |
| DE | 19545596 A1 | | 6/1996 | |
| DE | 19501292 C2 | * | 10/1998 | ............ B60J 10/24 |
| DE | 20122272 U1 | * | 12/2004 | ............ B60J 5/0416 |
| DE | 19747709 B4 | * | 7/2005 | ............ B60J 5/0416 |
| DE | 202009011028 U1 | * | 12/2009 | ............ B60J 5/0425 |
| DE | 102013202461 A1 | | 8/2014 | ............ B32B 27/12 |
| DE | 102013016858 A1 | * | 4/2015 | ......... B29C 45/0441 |
| DE | 102016106123 A1 | * | 10/2017 | |
| EP | 2604457 A1 | * | 6/2013 | ............ B60J 5/0415 |
| EP | 2604457 B1 | * | 2/2014 | ............ B60J 5/0415 |
| EP | 2604458 B1 | * | 4/2014 | ............ B60J 5/0415 |
| GB | 2096195 A | * | 10/1982 | ............... B27N 3/12 |
| JP | 6527246 B2 | | 6/2019 | ....... B29C 45/14336 |
| JP | 6543839 B2 | | 7/2019 | |
| WO | 1997006024 A1 | | 2/1997 | |
| WO | WO-2013088268 A1 | * | 6/2013 | ............ B60J 5/0415 |
| WO | WO-2014124817 A1 | * | 8/2014 | ............ B32B 27/12 |
| WO | 2017176738 A1 | | 10/2017 | |
| WO | WO-2018001866 A1 | * | 1/2018 | ............ B27N 3/002 |
| WO | 2021001210 A1 | | 1/2021 | |

\* cited by examiner

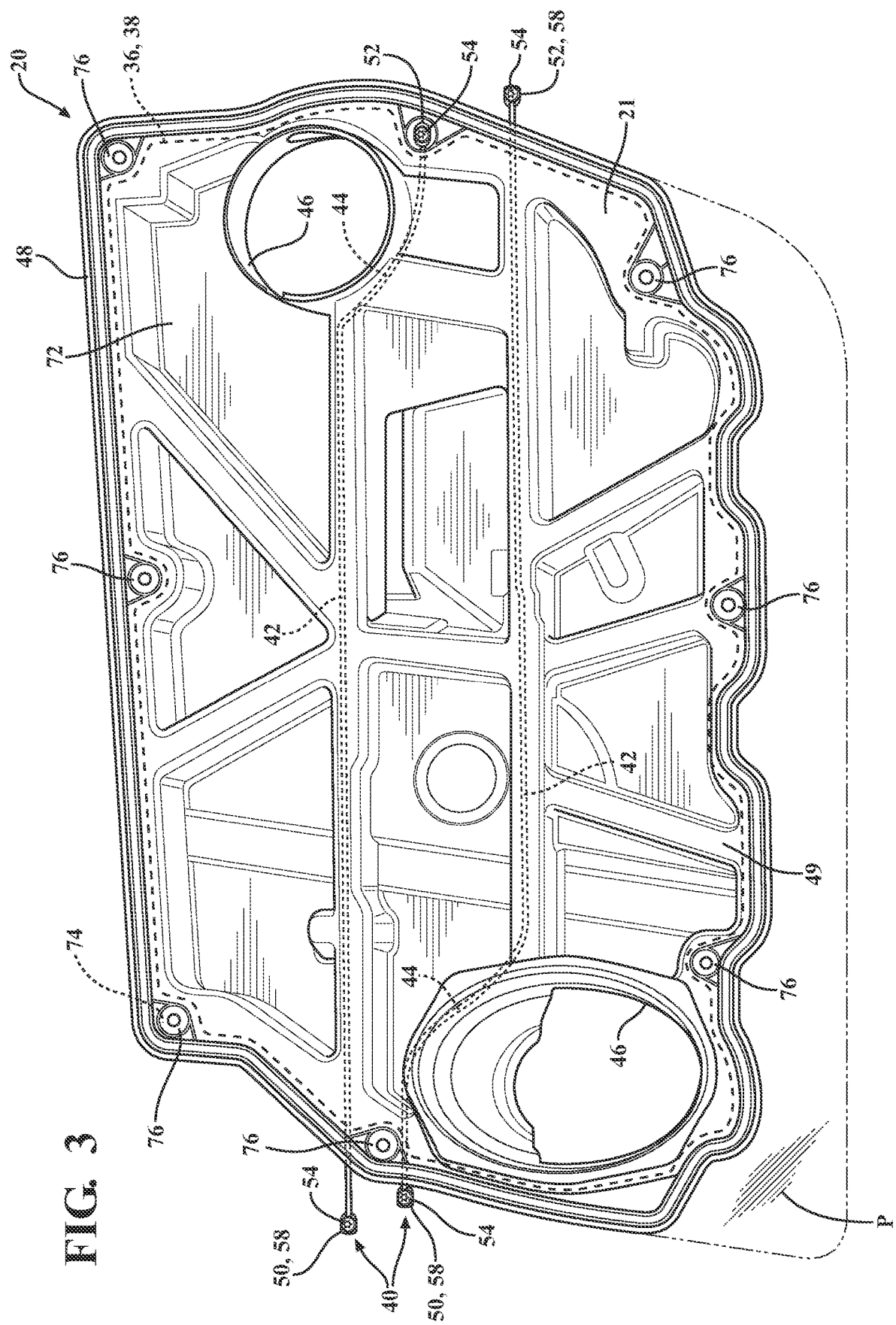

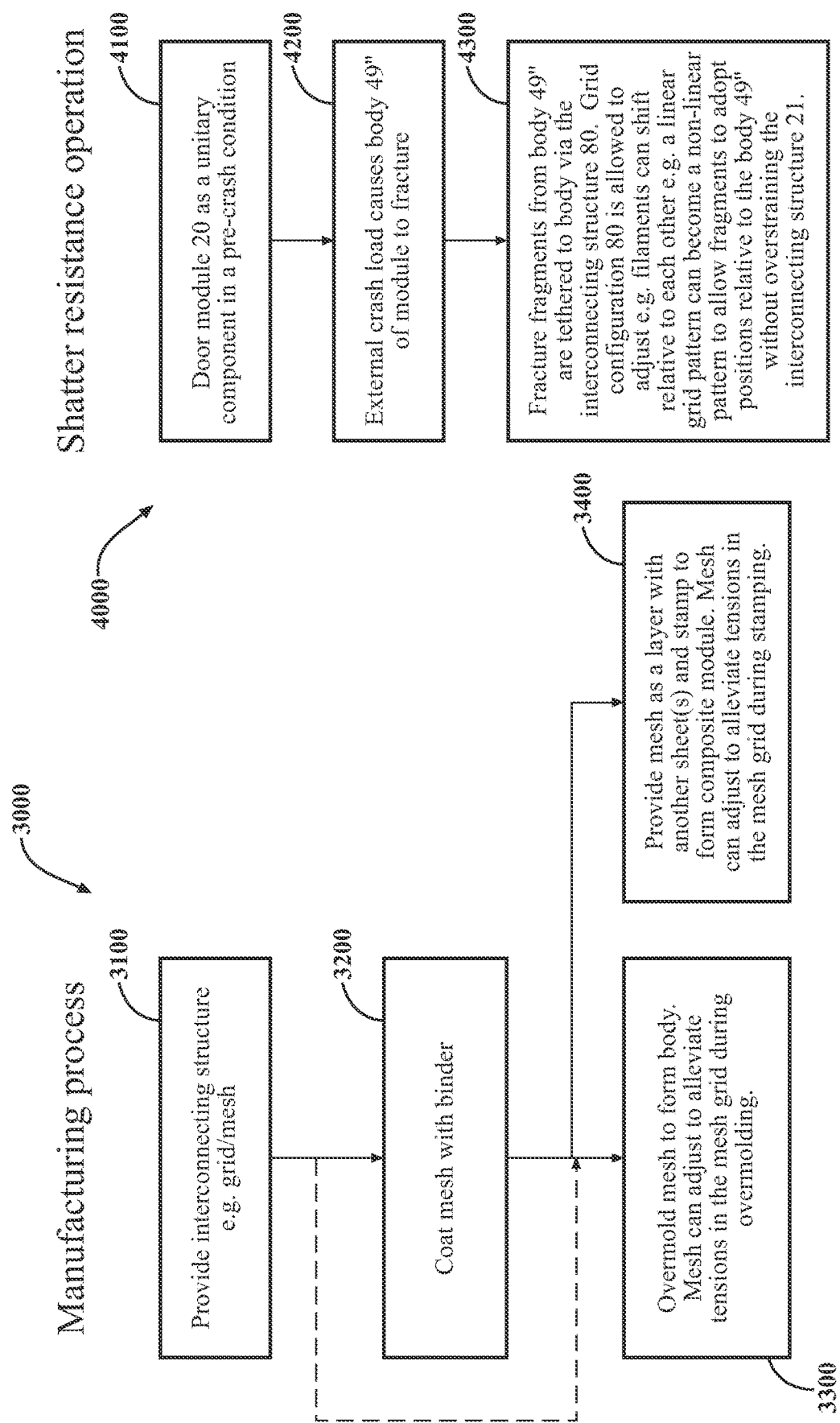

VEHICLE DOOR WITH CARRIER MODULE HAVING SUSTAINABLE CARRIER

CROSS-REFERENCE TO RELATED APPLICATION

This application claims the benefit of U.S. Provisional Application Ser. No. 63/090,939, filed Oct. 13, 2020, and of U.S. Provisional Application Ser. No. 63/003,072, filed Mar. 31, 2020, which are both incorporated herein by reference in their entirety.

FIELD

The present disclosure relates generally to vehicle door assemblies, and more particularly to carrier modules therefor.

BACKGROUND

This section provides background information related to the present disclosure which is not necessarily prior art.

The automotive industry continuously seeks to utilize materials that are lightweight, readily recyclable and environmentally sustainable in components, where possible. However, in some cases, such as when a component may be exposed to high forces and/or exposed to moisture, the component may be made of a relatively heavy metal and/or plastic materials. While plastic materials may be recyclable, current inspection and sorting stations used to identify recyclable materials, such as via optical recycling sorting cameras, generally overlook plastic material components due to their being dark, and in most cases, black. Further yet, plastic materials generally are not environmentally friendly or biodegradable. One such component that is known to be made of metal or plastic is a carrier of a carrier module. Although metal or plastic carriers can be useful to provide desired structural and barrier functions (preventing debris and fluid from transferring from a wet side of the carrier module to a dry side of the carrier module and generally being able to resist degradation when exposed to moisture/fluid), they tend to be relatively heavy, thereby negatively affecting fuel efficiency via added weight, which is also receiving ever-increasing attention, such as through fuel economy regulation laws. Accordingly, the metal and plastic materials tend to by challenging to recycle in addition to being less than ideal from an environmental sustainability standpoint.

In addition to the aforementioned drawbacks presented by known carrier modules, further drawbacks can result during high impact. High impact forces on known metal and plastic carrier modules can cause the carrier module to be broken into multiple separate pieces, also referred to as fragments, which can prove problematic. For example, one or more of the fragments may result in unwanted projectiles and/or have a sharp edge, which could increase the likelihood of the fragment penetrating into an internal cabin of the vehicle and/or puncture an inflationary restrain device, often referred to as "air bag," thereby potentially reducing the efficacy of the air bag.

In view of the above, there is a need to provide a carrier that can be readily sorted as a recyclable material via automated sorting equipment, including with optical recycling sorting cameras, while being environmentally friendly, environmentally sustainable and biodegradable, while at the same time being able to perform desired structural and barrier functions without becoming shattered or broken into separate pieces upon experiencing a high impact force, that enhances economies of manufacture and assembly, while reducing weight to enhance fuel economy of the vehicle.

SUMMARY

This section provides a general summary of the disclosure and is not intended to be considered a complete and comprehensive listing of the disclosure's full scope or all of its aspects, advantages, objectives and/or features.

It is an object of the present disclosure to provide a carrier for a carrier module of a door assembly of a motor vehicle that addresses at least those issues discussed above of known carriers.

In accordance with one aspect, the present disclosure is directed to a carrier for a carrier module of a door assembly of a motor vehicle that is readily recyclable and separable from non-recyclable materials, such as via optical recycling sorting cameras.

In accordance with another aspect, the present disclosure is directed to a carrier for a carrier module of a door assembly of a motor vehicle that is environmentally sustainable, environmentally friendly, readily recyclable and separable from non-recyclable materials, such as via optical recycling sorting cameras, has high structural strength to provide desired side impact resistance, is resistant to moisture and fluid penetration, thereby providing desired barrier function to prevent the transfer of moisture/fluid from a wet side of the carrier module to a dry side of the carrier module, is resistant to degradation in the presence of moisture/fluid, and reduces weight of the carrier module relative to those made of metal or plastic, thereby enhancing fuel economy of the vehicle.

In accordance with another aspect, the present disclosure is directed to a carrier for a carrier module of a door assembly of a motor vehicle that is resistant to breaking into multiple, separate pieces upon being impacted in a crash condition, thereby maintaining the carrier as a single, monolithic piece of material to minimize the risk of damage to neighboring components and to inhibit separate pieces from projecting outside of an internal door cavity of a vehicle door panel structure.

In accordance with another aspect, the present disclosure is directed to a door assembly for a motor vehicle having an outer panel, an inner panel, and a carrier module having a carrier that is environmentally sustainable, environmentally friendly, readily recyclable and separable from non-recyclable materials, such as via optical recycling sorting cameras, has high structural strength to provide desired side impact resistance, is resistant to moisture and fluid penetration, thereby providing a desired barrier function to prevent the transfer of moisture/fluid from a wet side of the carrier module to a dry side of the carrier module, is resistant to degradation in the presence of moisture/fluid, and reduces weight of the carrier module relative to those made of metal or plastic, thereby enhancing fuel economy of the vehicle.

In accordance with another aspect of the disclosure, a carrier for a carrier module of a motor vehicle door assembly having inner and outer panels defining a door panel structure with the inner panel having an opening for selective access to an internal door cavity between the inner and outer panels is provided. The carrier includes a body with opposite sides bounded by an outer periphery configured for attachment to the inner panel to substantially close off the opening. The opposite sides of the body having a color that is distinguishable from a black surface to facilitate being identified in a recycling sorting process.

In accordance with another aspect of the disclosure, the opposite sides of the body can be provided having non-black color that is distinguishable from a black surface.

In accordance with another aspect of the disclosure, the body is formed from a mixture of natural fibrous material and a binder, with the binder bonding the natural fibrous material together.

In accordance with another aspect of the disclosure, a fluid impervious layer is bonded to as least one of the opposite sides of the carrier to facilitate the prevention of moisture/fluid from coming into contact with the natural fibrous material.

In accordance with another aspect of the disclosure, the body has a plurality of fastener through openings adjacent the outer periphery and further including a metal or plastic grommet fixed in each of the plurality of fastener through openings to facilitate fixing the carrier to the inner panel of the door panel structure without damaging the natural fibrous material.

In accordance with another aspect of the disclosure, the body of the carrier can be formed having a perforate structure with a plurality of through openings to reduce the weight of the carrier.

In accordance with another aspect of the disclosure, the perforate structure of the body can be formed having a honeycomb patterned structure.

In accordance with another aspect of the disclosure, the body can include a mesh fixed thereto to inhibit the body from becoming fractured into multiple, separate pieces upon experiencing an impact force during a crash condition, thereby maintaining the body as a single piece of interconnected material, wherein pieces can be fractures within the body, but remain tethered to one another.

In accordance with another aspect of the disclosure, a carrier for a carrier module of a motor vehicle door assembly having an inner panel and an outer panel defining a door panel structure with the inner panel having an opening to an internal door cavity between the inner and outer panels, the carrier including a body with opposite sides bounded by an outer periphery configured for attachment to the inner panel to substantially close off the opening, the body formed from non-synthetic material.

In accordance with another aspect of the disclosure, a carrier for a carrier module of a motor vehicle door assembly having an inner panel and an outer panel defining a door panel structure with the inner panel having an opening to an internal door cavity between the inner and outer panels, the carrier including a body with opposite sides bounded by an outer periphery configured for attachment to the inner panel to substantially close off the opening, the body formed without thermoplastics.

In accordance with another aspect of the disclosure, a carrier for a carrier module of a motor vehicle door assembly having an inner panel and an outer panel defining a door panel structure with the inner panel having an opening to an internal door cavity between the inner and outer panels, the carrier including a body with opposite sides bounded by an outer periphery configured for attachment to the inner panel to substantially close off the opening, the body formed without using man-made chemically derived materials.

In accordance with another aspect of the disclosure, a carrier for a carrier module of a motor vehicle door assembly having an inner panel and an outer panel defining a door panel structure with the inner panel having an opening to an internal door cavity between the inner and outer panels, the carrier including a body with opposite sides bounded by an outer periphery configured for attachment to the inner panel to substantially close off the opening, the body formed using renewable materials. In a related aspect the body may include at least one layer substantially formed using renewable materials. In a related aspect the layers may be at least one or adhered together and sealed using a resin formed using renewable materials.

In accordance with another aspect of the disclosure, a carrier for a carrier module of a motor vehicle door assembly having inner and outer panels defining a door panel structure with the inner panel having an opening for selective access to an internal door cavity between the inner and outer panels is provided. The carrier includes a body with opposite sides bounded by an outer periphery configured for attachment to the inner panel to substantially close off the opening. The body is formed including a mesh fixed thereto. The mesh prevents the body from breaking into separate pieces of material upon experiencing impact forces, thereby minimizing the risk of damage to neighboring components from the body and preventing separate pieces from projecting outside of an internal door cavity of a vehicle door panel structure.

In accordance with another aspect of the disclosure, the binder material can bond the mesh to the body.

In accordance with another aspect of the disclosure, the mesh can be overmolded by material of the body.

In accordance with another aspect of the disclosure, the mesh can be sandwiched between a pair of mats of the mixture of natural fibrous material, and the pair of mats can be overmolded by the binder material.

In accordance with another aspect of the disclosure, the mesh can be formed of natural fibers.

In accordance with another aspect of the disclosure, the natural fibers of the mesh can be provided as continuous, elongate multifilament yarns interlaced with one another, such as via being woven or knit together.

In accordance with another aspect of the disclosure, the filaments of the mesh can be pre-coated with a binder material to facilitate bonding of the mesh to the body upon application of sufficient heat to melt the binder material.

In accordance with another aspect of the disclosure, the filaments of the mesh can be provided having sub-filaments extending radially outwardly therefrom, wherein the sub-filaments enhance bonding of the mesh to the body.

In accordance with another aspect of the disclosure, the natural fibers of the mesh can be interlaced with one another at nodes, wherein the nodes can allow the interconnected natural fibers to move relative to one another while maintaining the natural fibers in interconnected relation with one another at the nodes, thereby minimizing the build-up of internal stresses within the body of the carrier during both manufacture, making it easier to shape the body as desire, and while experiencing an impact force during a crash condition, further reducing the tendency for causing the body to crack.

In accordance with another aspect of the disclosure, the nodes can be formed by loops in a knitting process or by cross-over junctions in a weaving process.

In accordance with another aspect of the disclosure, a carrier for a carrier module of a motor vehicle door assembly having inner and outer panels defining a door panel structure with the inner panel having an opening for selective access to an internal door cavity between the inner and outer panels is provided. The carrier includes a body with opposite sides bounded by an outer periphery configured for attachment to the inner panel to substantially close off the opening. The body is formed including a network of filaments interconnected by a plurality of nodes, wherein the body, when in a non-crash state, prevents a shifting of the nodes relative to the filaments intersecting with a respective node to maintain the structural integrity of the body, and wherein the body, in a crash state, allows a shifting of the nodes relative to at least some of the filaments intersecting with a respective node to inhibit the shatter of the carrier.

In accordance with another aspect of the disclosure, a carrier for a carrier module of a motor vehicle door assembly having inner and outer panels defining a door panel structure with the inner panel having an opening for selective access to an internal door cavity between the inner and outer panels is provided. The carrier includes a body with opposite sides bounded by an outer periphery configured for attachment to the inner panel to substantially close off the opening. The body is formed including a network of filaments, wherein the filaments include a plurality of sub-filaments extending from the filaments for encompassment by and fixation to the body.

In accordance with another aspect of the disclosure, a method of manufacturing a carrier of a carrier module for a motor vehicle door panel structure for closing off an opening in an inner panel of the motor vehicle door panel structure is provided. The method includes providing recyclable, natural fibrous material; adding a binder material to the recyclable, natural fibrous material; forming a web of the recyclable, natural fibrous material and the binder material; disposing the web between mold halves; and compressing the web between the mold halves to form a body having opposite sides bounded by an outer periphery configured for attachment to the inner panel to substantially close off the opening with the opposite sides being formed having a finished contour of the carrier.

In accordance with another aspect of the disclosure, the method of manufacturing the carrier module can further include applying heat and pressure while compressing the web to bond the recyclable, natural fibrous material and the binder material together.

In accordance with another aspect of the disclosure, the method of manufacturing the carrier module can further include bonding a fluid impervious layer to as least one of the opposite sides.

In accordance with another aspect of the disclosure, the method of manufacturing the carrier module can further include forming a plurality of fastener through openings adjacent the outer periphery and fixing a metal or plastic grommet in each of the plurality of fastener through openings.

In accordance with another aspect of the disclosure, the method of manufacturing the carrier module can further include forming said web and said body having a honeycomb structure.

In accordance with another aspect of the disclosure, a carrier for a carrier module of a motor vehicle door assembly having an inner panel and an outer panel defining a door panel structure with the inner panel having an opening to an internal door cavity between the inner and outer panels, said carrier including a body with opposite sides bounded by an outer periphery configured for attachment to the inner panel to substantially close off the opening, said body formed from a composite structure of natural fibers.

In accordance with another aspect, a composite structure for a motor vehicle component having a mesh core formed using a natural or plant based material, and at least one or more layers of non-synthetic material connected to the mesh core.

In accordance with another aspect of the disclosure, a method of manufacturing a carrier for a carrier module of a motor vehicle door assembly including the steps of providing a body formed of at least one layer of natural fibrous material, and mounting a plurality of door hardware components to the body. In a related aspect, the body is formed free of or substantially free of synthetic material.

Further areas of applicability will become apparent from the description provided herein. The description and specific examples in this summary are only intended to illustrate certain non-limiting embodiments which are not intended to limit the scope of the present disclosure.

BRIEF DESCRIPTION OF THE DRAWINGS

The drawings described herein are for illustrative purposes only of selected non-limiting embodiments and are not intended to limit the scope of the present disclosure. In this regard the drawings include:

FIG. 3 illustrates a schematic plan view of a carrier of the carrier module of FIG. 2;

FIG. 15 is a flow diagram illustrating a method of manufacturing a carrier in accordance with another aspect of the disclosure; and FIG. 16 is a flow diagram illustrating a sequence of events from a pre-crash condition of a door module to a post-crash condition of the door module.

DETAILED DESCRIPTION OF EXAMPLE EMBODIMENTS

Figure 1:
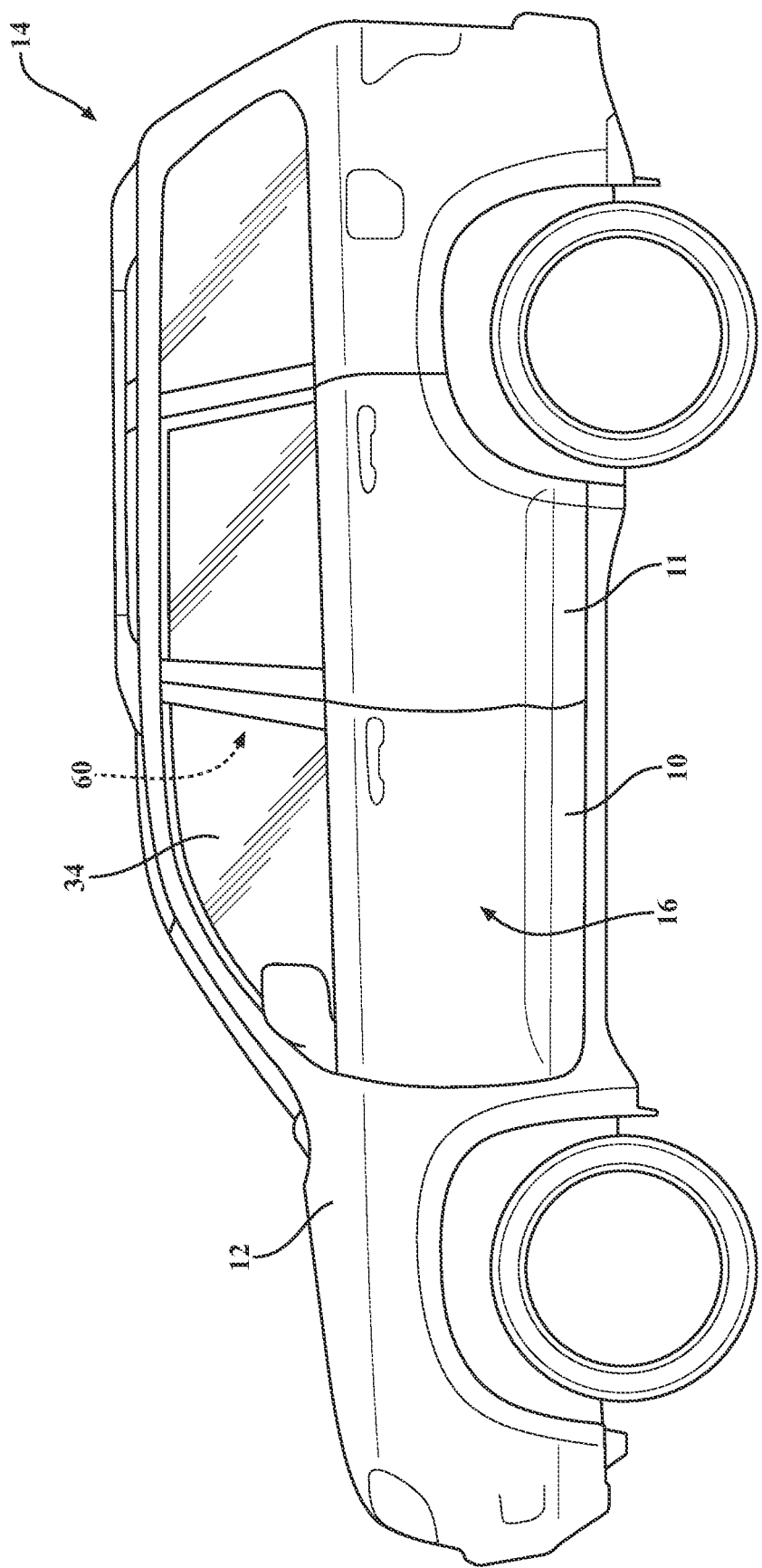
FIG. 1 illustrates a motor vehicle with a door assembly constructed in accordance with one aspect of the disclosure.

In general, example embodiments of a door assembly with carrier module and carrier module therefor, of the type configured including window regulators to be installed within an internal door cavity of a motor vehicle door assembly and having a barrier member configured to separate a wet side from a dry side of the door assembly, constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by the skilled artisan in view of the disclosure herein.

An example one-piece carrier module embodiment disclosed in accordance with one aspect of the disclosure includes a barrier member and a carrier member configured to provide a pre-integrated intrusion member arrangement, with a pair of window regulators integrally attached to the carrier member, wherein the carrier allows the associated window regulators and components to be supported while providing improved intrusion protection.

Another example one-piece carrier module embodiment disclosed in accordance with one aspect of the disclosure includes a wall bounded by an outer periphery sized to close off an opening in an inner door panel, wherein the wall is provided having a variable wall thickness to provide relatively thickened regions having a first thickness providing enhanced support and mount surfaces and side impact resistance and relatively thinned regions having a second thickness, that is less than the first thickness, enhancing economies of manufacture and assembly, while also reducing weight, thereby enhancing fuel economy of the vehicle.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Reference is made to FIG. 1, which shows a door assembly 10 mounted to a vehicle body 12 of a motor vehicle 14. The door assembly 10 includes an outer panel 16, an inner panel 18 (FIG. 2) and a carrier assembly, referred to hereafter as carrier module 20, having a carrier 21 constructed in accordance with one presently preferred aspect of the disclosure. The manufacture, assembly, reduced weight, performance and structural impact resistance of the door assembly 10 are enhanced directly as a result of the structure of the carrier 21. Further, the ability to readily sort the carrier 21 as a recyclable material via automated sorting equipment, including with optical recycling sorting cameras, is enhanced via the material content of carrier 21, with carrier 21 also being environmentally friendly, environmentally sustainable and biodegradable. It will be appreciated by the skilled artisan that the carrier module 20 and carrier 21 thereof can be incorporated into a rear passenger door assembly 11 or any other closure panel desired.

Figure 2:
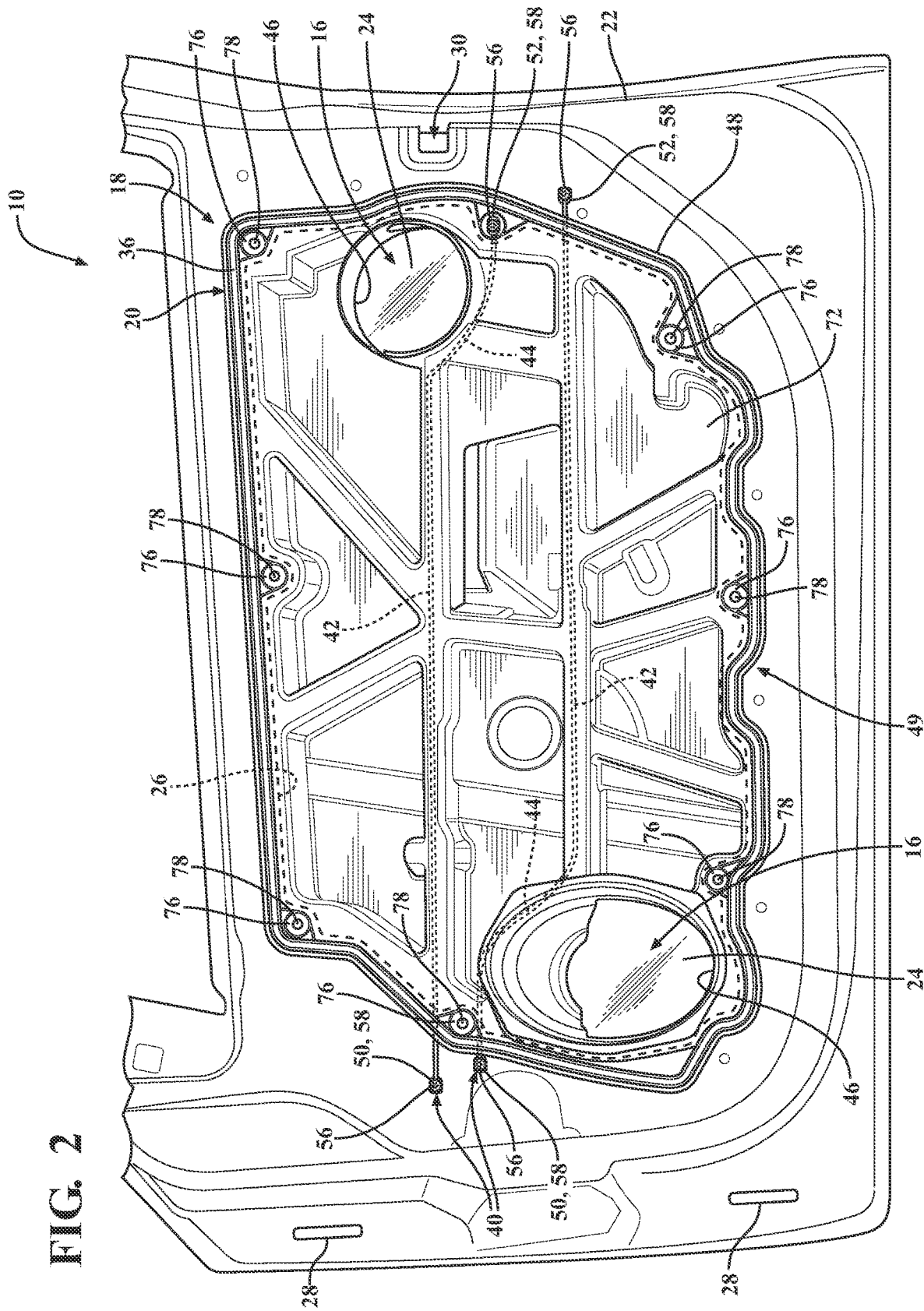
FIG. 2 is a schematic perspective view of a door assembly of the vehicle of FIG. 1 having a carrier module in accordance with another aspect of the disclosure.

The outer panel 16 forms at least part of the exterior surface of the door assembly 10. The inner panel 18 provides a structural member for the mounting of one or more trim pieces that form an inner surface of the door assembly 10. Some of the inner panel 18 may itself also form part of the inner surface of the door assembly 10, if desired. The outer and inner panels 16, 18 are connected together to provide a door panel structure 22 that forms an internal door cavity 24 that contains various components of the door assembly 10, including components of the carrier module 20. To facilitate assembly of the components into the cavity 24, the inner panel 18 has at least one opening 26 (FIG. 2). The opening 26 is sized to allow access to the cavity 24 as necessary and desired for assembly and service of components therein, as is known.

The outer and inner panels 16, 18 may be made from any suitable material or combination of materials. For example, the outer and inner panels 16, 18 may both be made from a suitable metal (e.g. a suitable steel). In another example, the outer panel 16 may be made from a suitable polymeric or composite material (e.g. fiberglass) and the inner panel may be made from a suitable metal, by way of example and without limitation.

A pair of hinges 28 are connected to door panel structure 22 and pivotally mount a front end of door panel structure 22 (and door assembly 10) to the vehicle body 12. A door latch 30 is mounted to the rear end of door panel structure 22 to permit the releasable closure of door assembly 10 against vehicle body 12, as is known. Hinges 28 and door latch 30 act as force transfer members through which forces in door assembly 10 are transmitted to vehicle body 12. Such forces include, for example, side-impact forces from another vehicle or object colliding with the vehicle 14.

Carrier 21 is shown as being configured for sealed mounting to inner panel 18 and to support a plurality of door hardware components, such as window and door latch components, including a power-operated window regulator having an electric motor-driven cable, pulleys, and lifter plates for moving a window 34 within glass run channels, by way of example and without limitation, as will be understood by one possessing ordinary skill in the vehicle door assembly art.

In accordance with a non-limiting embodiment, carrier 21 can be formed to function both as a fluid (water and moisture) barrier and as a sound barrier, and can be provided as a single-piece panel configured to receive a plurality of the aforementioned powered actuators and door hardware components in integrally formed contoured pockets. The carrier 21 can be adapted to be installed in fixed attachment to a surface of the inner panel 18 facing the passenger compartment of the vehicle 14 upon fixing the various components, such as those discussed above, in the internal door cavity 22. Further, in order to facilitate assembly, including ensuring the carrier 21 is properly located and fixed in sealed relation relative to the inner panel 18, the carrier 21 can be formed including a peripherally extending seal bead 36. The seal bead 36 can be provided as any suitable continuous bead of adhesive material capable of maintaining a fluid-tight seal between the carrier 21 and an outer surface of the inner panel 18, such as butyl, by way of example and without limitation. A selectively removable protective layer 38, sometimes referred to as release paper or release film, and referred to hereafter as release member 38, can be disposed over the seal bead 36 until it is desired to expose the seal bead 36 for bonding with the inner panel 18, thereby protecting the seal bead 36 against unwanted contamination.

Carrier 21 is formed from a recyclable, environmentally sustainable (the quality of not being harmful to the environment or depleting natural resources, and thereby supporting long-term ecological balance), biodegradable material, such as from natural fibers (NF) of natural fibrous material(s) (NF'). Furthermore carrier 21 is formed using sustainable and material renewable materials, such as plant fibers and rock fibers. The carrier 21 of the present disclosure is distinguished from known carriers formed from non-sustainable and non-renewable materials such as petroleum based materials requiring man-made chemical processes, such as chemical synthesis for example, to create forms of synthetic materials and synthetic fibres such as polymers and plastics, such as thermoplastics, for forming a carrier. Some well suited natural fibrous materials (NF') include various types of natural fibers (NF), for example plant based fibers, such as bast fibers, cellulosic fibers, cane fibers, including kenaf, hemp, flax, bamboo, and jute, by way of example and without limitation. Such materials may be derived from plants or rocks for example. Other examples of natural fibrous materials (NF') may also be a rock based material, such as basalt fibers. Due to the content of the natural fibers (NF), the resulting carrier 21 is a color that can be distinguished from black, and thus, can be provided as a color other than black, referred to as non-black, and generally tending toward a hue of tan or other generally light color, with "light color" being relative to black. Accordingly, the ability of an optical recycling sorting camera to identify the carrier 21 as being recyclable is greatly enhanced. Further, being made entirely or substantially (nearly entirely, such as between 90-99.9 percent-by-weight (%/wt), and more preferably between 95-99.9%/wt, the carrier 21 is lightweight (20 percent of lighter than a similarly sized and shaped carrier of polypropylene (PP)), has high strength, particularly if the natural fibrous material (NF') is kept dry, is 100% recyclable, 100% renewable, and 100% biodegradable, has a low content of volatile organic compounds (VOC) and is formaldehyde free, functions excellent as acoustic insulation, and exhibits a high heat stability up to temperatures of 220 degrees Centigrade (° C.).

Carrier 21 of carrier module 20, in accordance with one aspect of the disclosure, can be manufactured to include at least one intrusion member 40, also referred to as a reinforcement member or impact reinforcement member, formed of a material different from the carrier 21, with the at least one intrusion member 40 having a resistance to loading, such as a resistance to bending or deformation for example as caused by a load applied to the carrier 21, and for example having a strength and/or stiffness greater than the material of the carrier 21. The at least one intrusion member 40 is shown as a plurality of high strength elongate members, such as elongate high strength metal wires/rods, referred to hereafter as elongate rods 40, by way of example and without limitation, though other materials are contemplated herein, including elongate high strength non-metal members, such as elongate high strength non-metal rods, and unidirectional tape, to provide the carrier module 20 with an enhanced impact resistance against impact forces directed transversely to a plane P (FIG. 3) along which carrier 21 generally extends, thereby enhancing the side impact resistance of carrier 21 and door assembly 10, thus, providing enhanced protection to occupants within motor vehicle 14 during side impacts, such as those experienced during an accident. Also, the at least one intrusion member 40 may be provided as, or in addition to, a high-stiffness member augmenting the stiffness of the carrier module 20 to withstand deformation, for example caused by road vibration, or sound vibrations generated by speakers mounted to the carrier module 20. The enhanced side impact resistance provided by carrier module 20 eliminates the need for separate side impact beams/members, including those commonly found extending within a cavity of a door assembly, thereby freeing up space within cavity 24, which ultimately makes assembly of components therein easier. Further yet, as will be appreciated by the skilled artisan, economies of manufacture and assembly are recognized by having the elongate rods 40 integrated as a component of the carrier module 20. The enhanced stiffness of the carrier module 20 provided by intrusion member(s) 40 may eliminate the development of resonance frequencies within the carrier module 20 and may improve the sound performance of mounted speakers to the carrier module 20. However, it is to be recognized that carrier 21 can be manufactured as a stand-alone carrier 21, without intrusion members (s) 40 integrated therein, if desired for the intended application.

Figure 2A:
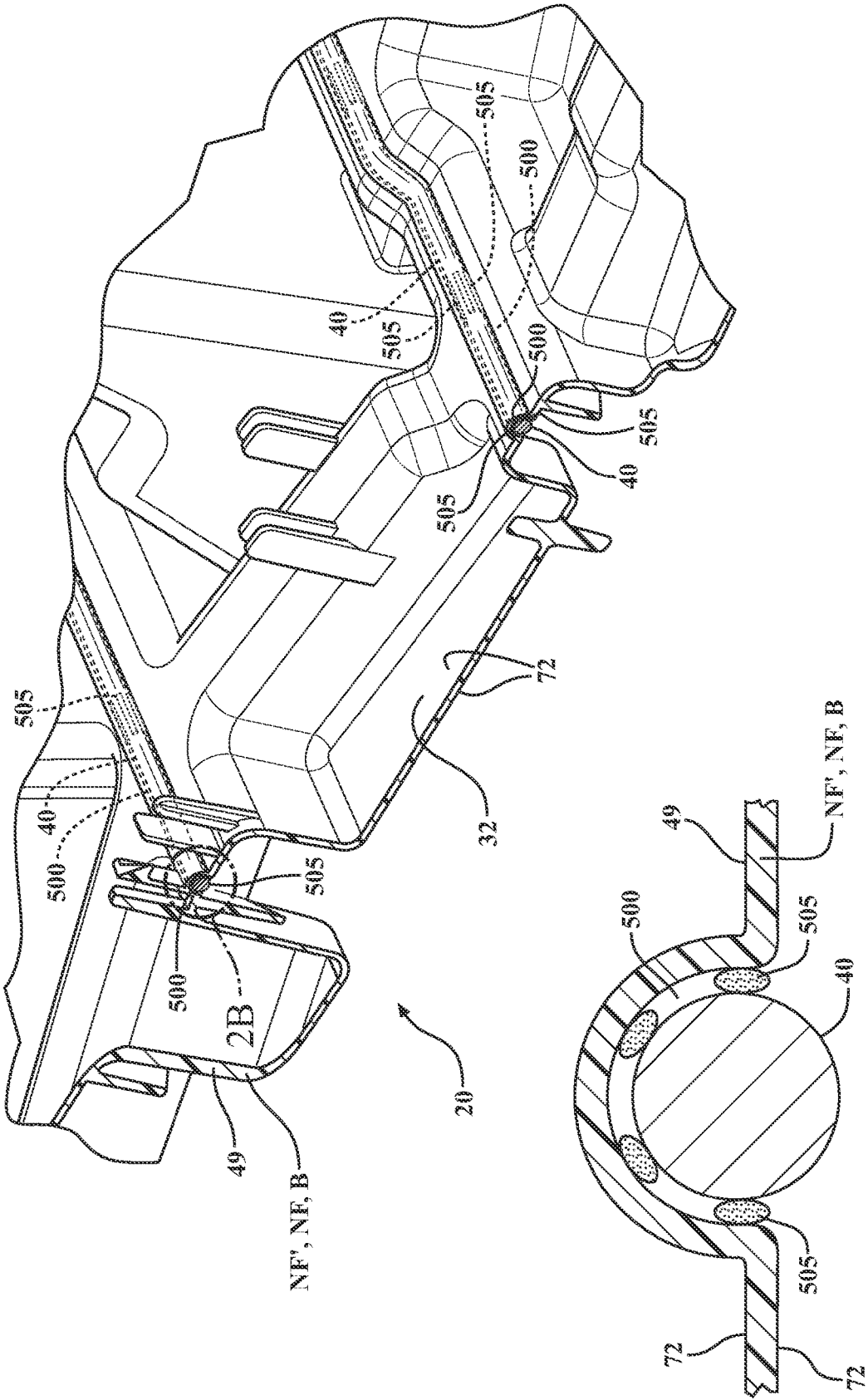
FIG. 2A is an enlarged perspective cross-sectional view of a portion of the door assembly of FIG. 2.
Figure 2B:
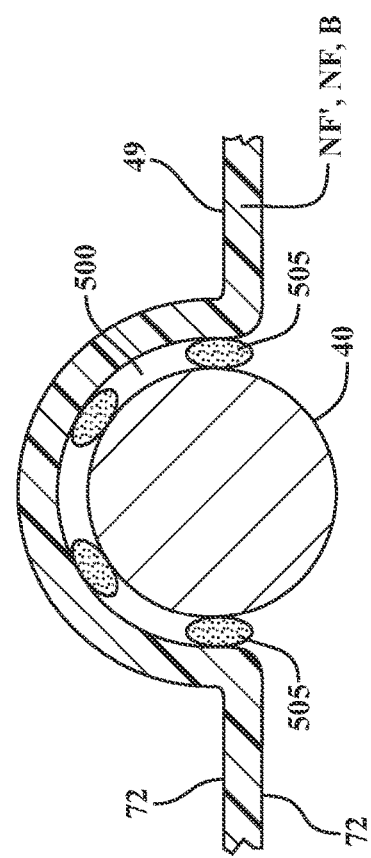
FIG. 2B is an enlarged cross-sectional view illustrating an encircled area 2B of FIG. 2A.

The intrusion member(s) (elongate metal and/or non-metal rod(s)), referred to hereafter as rods 40, if provided, can be mechanically connected and fixed with the carrier 21, for example by being inserted into mating receptacles 500 (FIGS. 2A and 2B) formed in the carrier 21. Retention features 505 may be provided to fix and lock the rods 40 into mechanical connection with carrier 21, for example after the rods 40 have been snapped and/or bonded into fitted engagement with the receptacle 500. Adhesive may also be provided to enhance the fixed connection between the rods 40 and the carrier 21. The intrusion member(s), such as rod(s) 40, can be formed of any desired high bending/tensile strength metal, such as steel, titanium, Kevlar, or otherwise, and can be shaped to extend along any desire straight (linear) and/or non-straight, arcuate (nonlinear) path. It is to be recognized that the aforementioned bending and/or tensile strength of intrusion member(s) is provided to be greater than the bending and/or tensile strength of the material of the carrier 21, thereby increasing the bending and/or tensile strength properties of carrier 21. In an exemplary embodiment illustrated, a pair of rods 40 are shown as extending in spaced relation from one another, having generally linear sections 42 extending generally parallel with one another and, having nonlinear sections 44 extending about carrier features, such as openings 46 provided for receipt of speakers, by way of example and without limitation. Rods 40 provided in spaced relation may accommodate components required to be positioned between rods 40 which may otherwise be provided in an overlapping arrangement, and for example which may be mounted to the carrier 21, or other adjacent components, such as an intrusion beam provided on one of the panels 16, 18, by way of example and without limitation. As a result, the cross-sectional dimension, e.g. width of the door assembly extending in a side-to-side vehicle direction, may be reduced. The rods 40 are shown as being configured to extend across a width (width direction extending from front end to rear end of motor vehicle 14) of the carrier 21 from one portion of an outer periphery 48 of carrier 21, bounding a body 49 of carrier 21, to another portion of the outer periphery 48 to span a corresponding dimension of the opening 26 in the inner panel 18. As such, it is to be recognized that rod(s) 40, if provided, can extend across the entirety of the opening 26, if desired, wherein body 49 is configured for attachment to the inner panel 18 to substantially close off the opening 26.

The rod(s) 40 extends lengthwise between opposite ends 50, 52, wherein at least one or both of the opposite ends 50, 52 can be configured to extend beyond the outer periphery 48 for anchored support against the inner panel 18. To facilitate anchoring the carrier assembly 20 and the rod(s) 40 to the inner panel 18, the opposite ends 50, 52 can be provided having through openings 54 configured for receipt of fasteners 56 therethrough to facilitate fixing the carrier module 20 to the inner panel 18. In the exemplary embodiment illustrated, the through openings 54 are shown extending through flattened end regions 58 of the rods 40. With the opposite ends 50, 52 of rod(s) 40 being fixed directly to inner panel 18, greatly enhanced tensile strength is provided to carrier assembly 20 across its width to enhance side impact resistance of door assembly 10, thereby minimizing the degree of intrusion of objects and inner panel 18 into an interior cabin 60 (FIG. 1) of motor vehicle 14 during a side impact crash condition.

Figure 4:
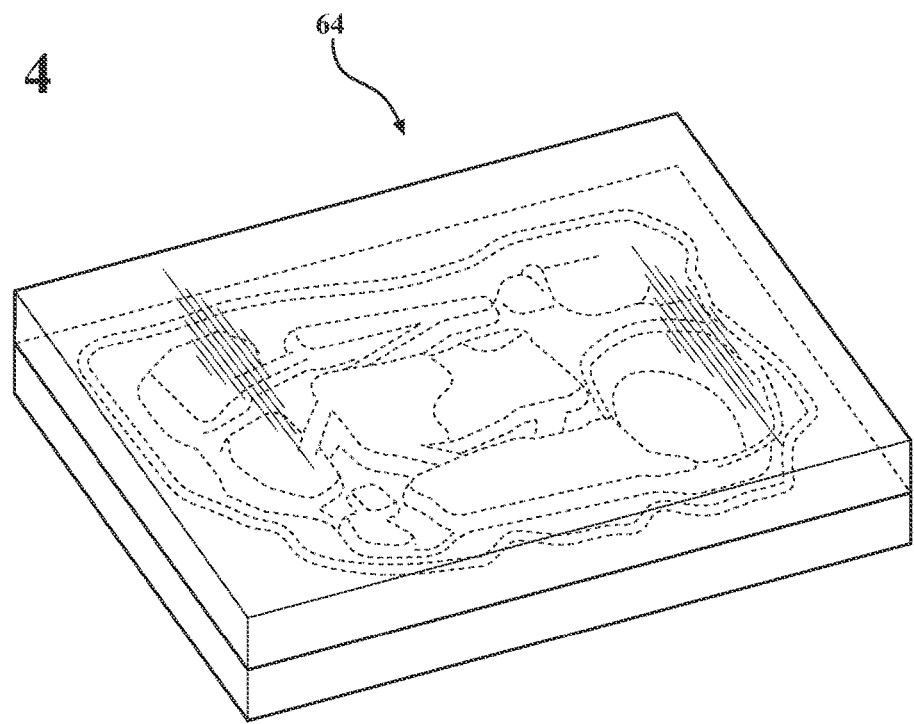
FIG. 4 is a perspective view of a mold for manufacturing a carrier in accordance with another aspect of the disclosure.
Figure 4A:
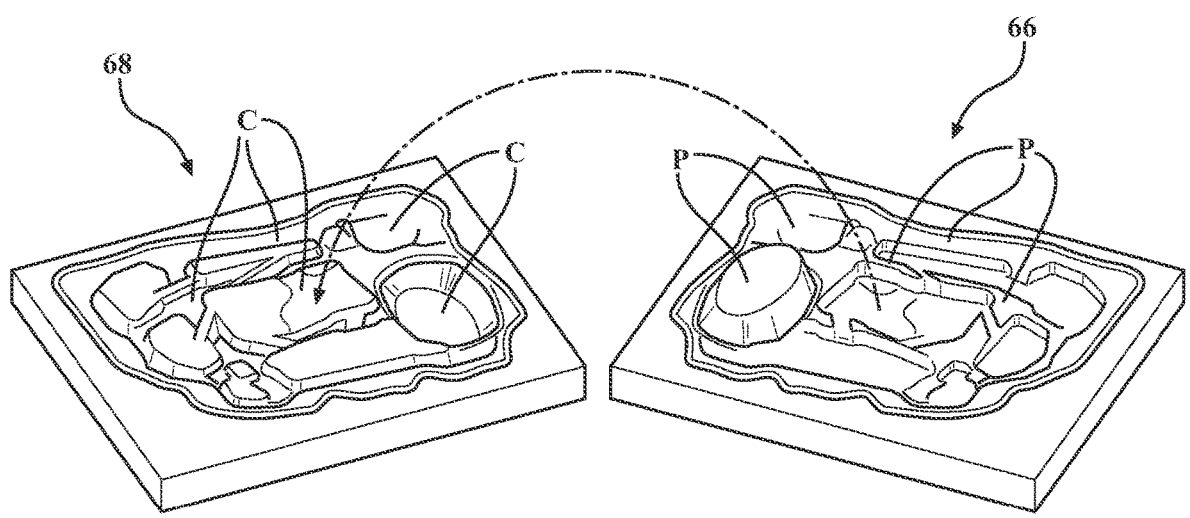
FIG. 4A illustrates mold halves of the mold of FIG. 4 shown in a open position.

Carrier body 49 has opposite sides, including a wet side 60 and a dry side 62, bounded by outer periphery 48. The opposite sides 60, 62 of the body 49 have a non-black color that is distinguishable from a black surface, as discussed above, to facilitate being identified in a recycling sorting process. Body 49, aside from being formed of the aforementioned natural fibers (NF) of natural fibrous material (NF'), includes bonder additive, also referred to as binder (B), wherein binder (B) facilitates bonding the natural fibers (NF) of natural fibrous material (NF') together. Binder (B) can be provided as an additive in a web forming process, such as an air-laying process, by way of example and without limitation, whereupon web can be subjected to a suitable heat-treatment process to causes binder (B) to melt and bond the natural fibers (NF) within web together. In addition to applying heat to melt binder (B), the web can be subjected to pressure, such as in a compression molding process (FIGS. 4 and 4A). Compression molding process utilizes mold assembly 64 having a male mold half 66 and a female mold half 68. Male mold half 66 includes outwardly extending protrusions P and female mold half 68 includes cavities C, wherein protrusions P and cavities C mirror and mate with one another in nesting relation to form the desired non-planar features of carrier 21. It is contemplated that the binder (B) can be provided to bond the natural fibers (NF) of natural fibrous material (NF') together without heat, wherein binder (B) can be provided as a suitable adhesive.

Figure 5:
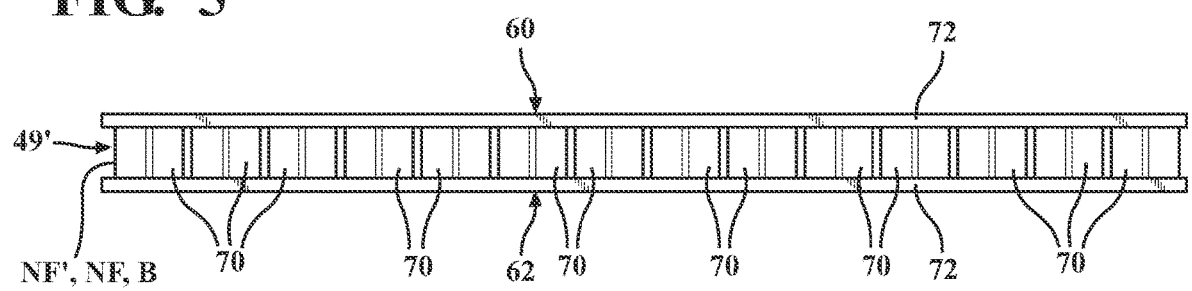
FIG. 5 illustrates a portion of a carrier in accordance with another aspect of the disclosure.
Figure 5A:
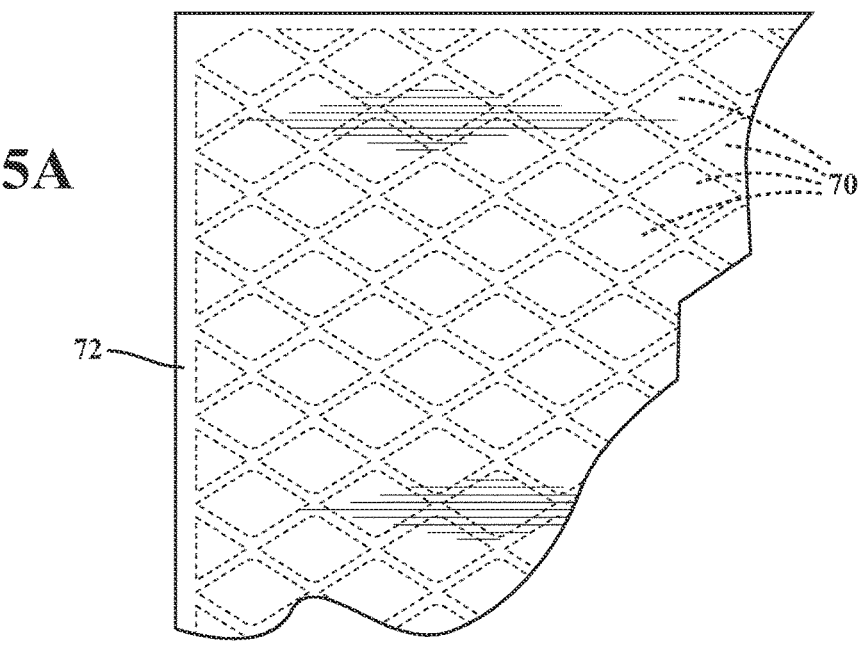
FIG. 5A is a plan view of a portion of a body of the carrier of FIG. 5.
Figure 6:
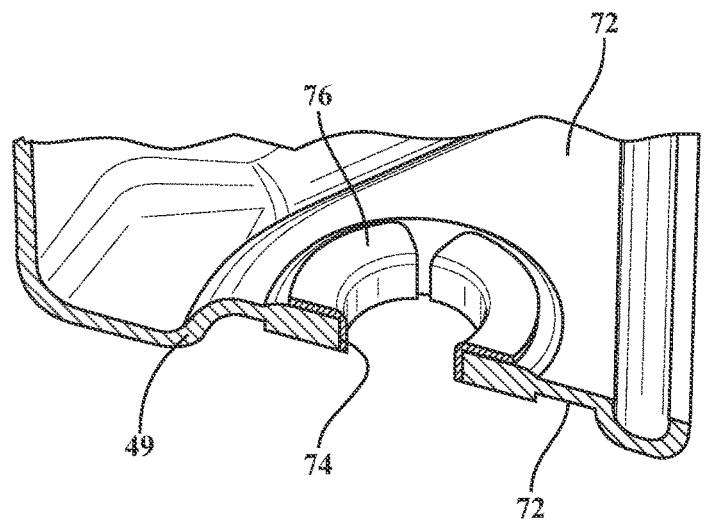
FIG. 6 is a cross-sectional perspective view taken through a fastener opening and grommet of a portion of the carrier of FIG. 3.

In accordance with another aspect, body 49' can be formed having a perforate structure with a plurality of through openings, also referred to as voids 70, extending through the opposite sides 60, 62. The voids 70 can form the body 49' having a honeycomb structure, such as shown in FIGS. 5 and 5A, or otherwise, as desired. The honeycomb structure, while exhibiting a high impact and crush strength, provides a greatly reduced weight due to the presence of the numerous voids 70.

A fluid impervious sealant material or layer, also referred to as water barrier 72, can be fixed to as least one of the opposite sides 60, 62 of body 49, 49', and preferably to at least the wet side 60 to prevent moisture or fluid on the wet side of carrier module 20 from reaching the natural fibrous material (NF') of the body 49, 49'. If desired, the layer 72 can be provided as a preformed solid sheet of sealant material, such as a polymeric or metal material (aluminum or otherwise), that is subsequently fixed to the wet side 60 and optionally to the dry side 62, such an adhesive and/or mechanical fastener. Layer 72 can also be applied via a spraying, dipping, or other coating process either prior performing the molding operation and/or after performing the molding operation.

Figure 7:
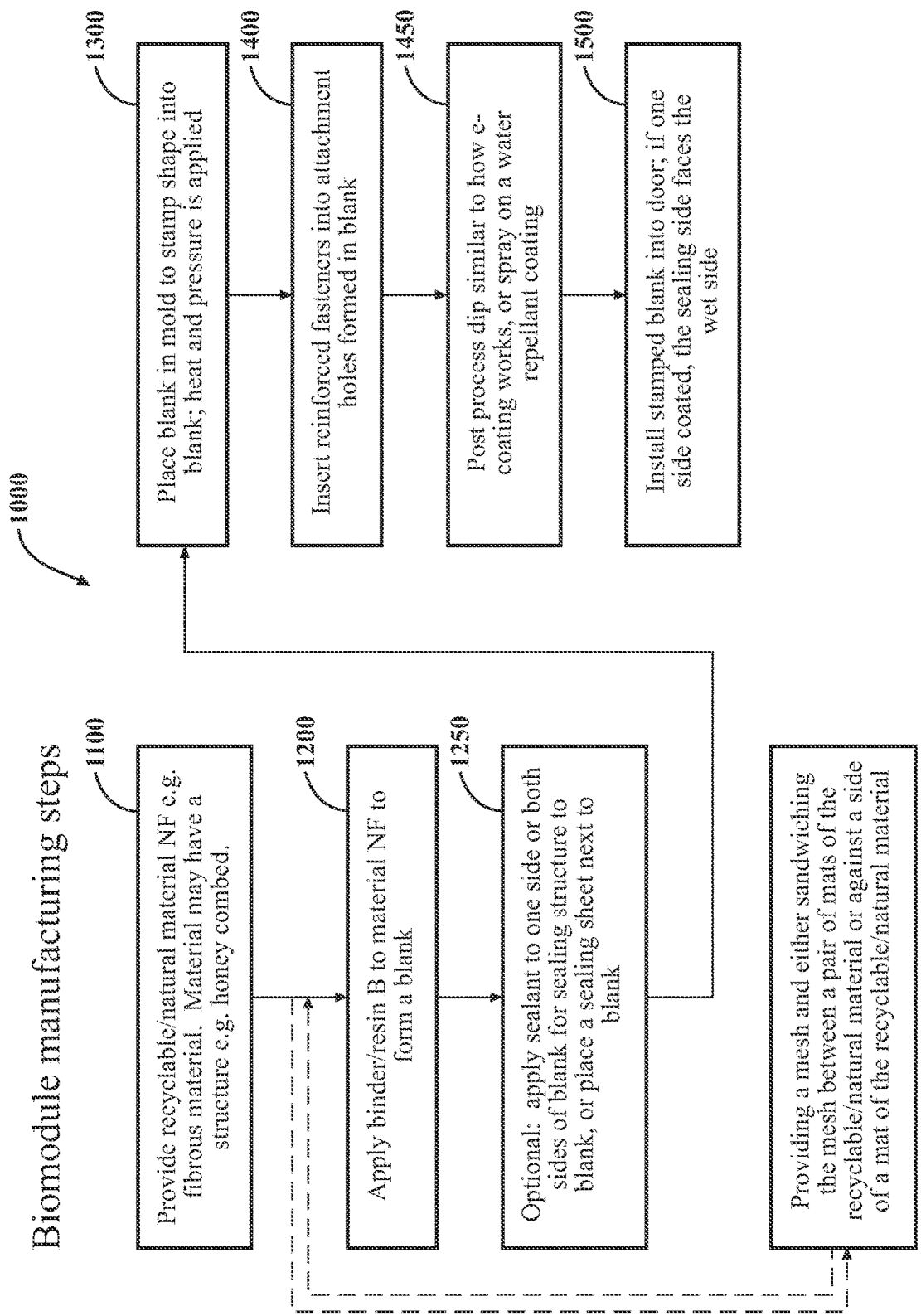
FIG. 7 is a flow diagram illustrating a method of manufacturing a carrier in accordance with another aspect of the disclosure.

Body 49, 49' can be formed having a plurality of fastener through openings 74 adjacent the outer periphery 48 and further including a metal or plastic grommet 76 fixed in each of the plurality of fastener through openings 74. Grommets 76 provide compressive structural support for receipt of fasteners 78 used to fix carrier 21 to inner panel 18, wherein grommets 76 prevent over-compression and tearing of the natural fibrous material. As shown in FIG. 7, grommets 76 can be inserted and fixed in through openings 74 after molding body 49, 49'.

Figure 10:
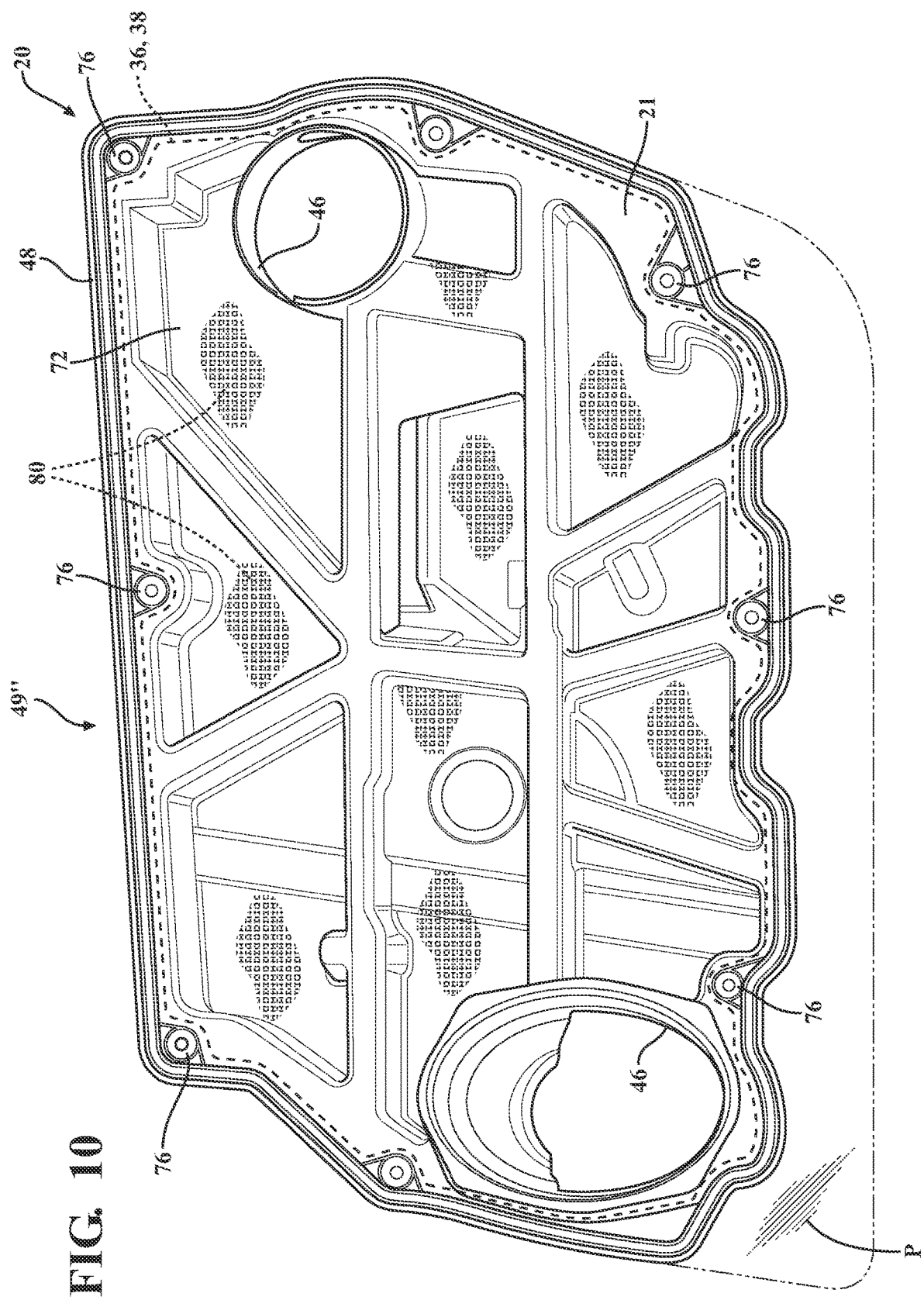
FIG. 10 is a perspective view of a carrier being manufactured in accordance with another aspect of the disclosure.
Figure 11:
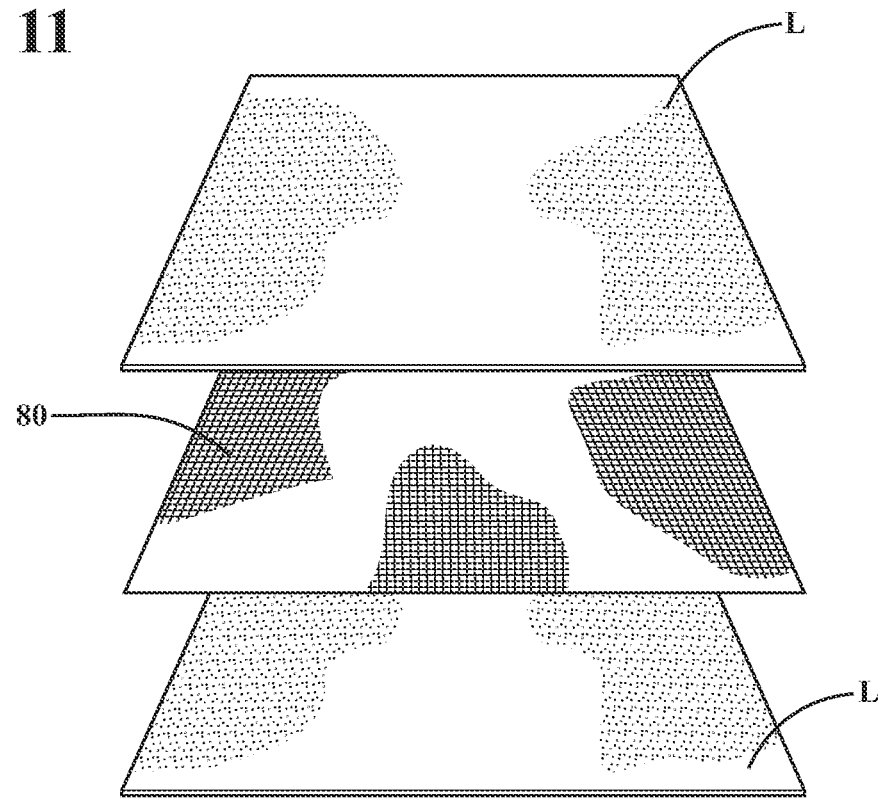
FIG. 11 is a perspective view illustrating an optional stage of manufacture of the carrier of FIG. 10.
Figure 11A:
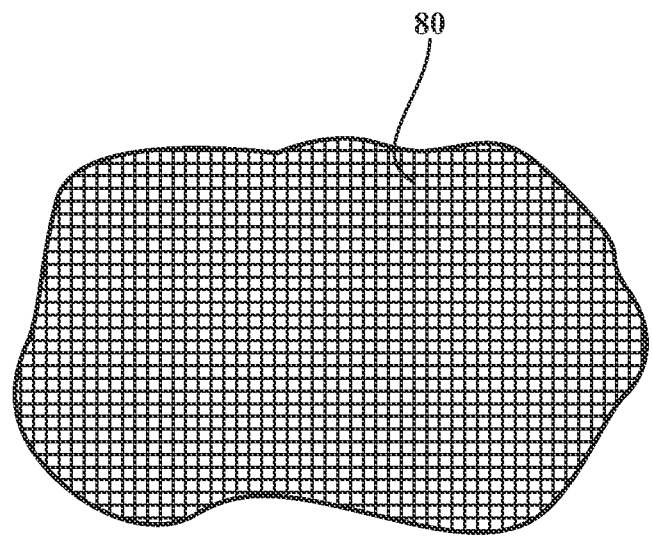
FIG. 11A is an enlarged, fragmentary view of a mesh of the carrier of FIG. 10.
Figure 11B:
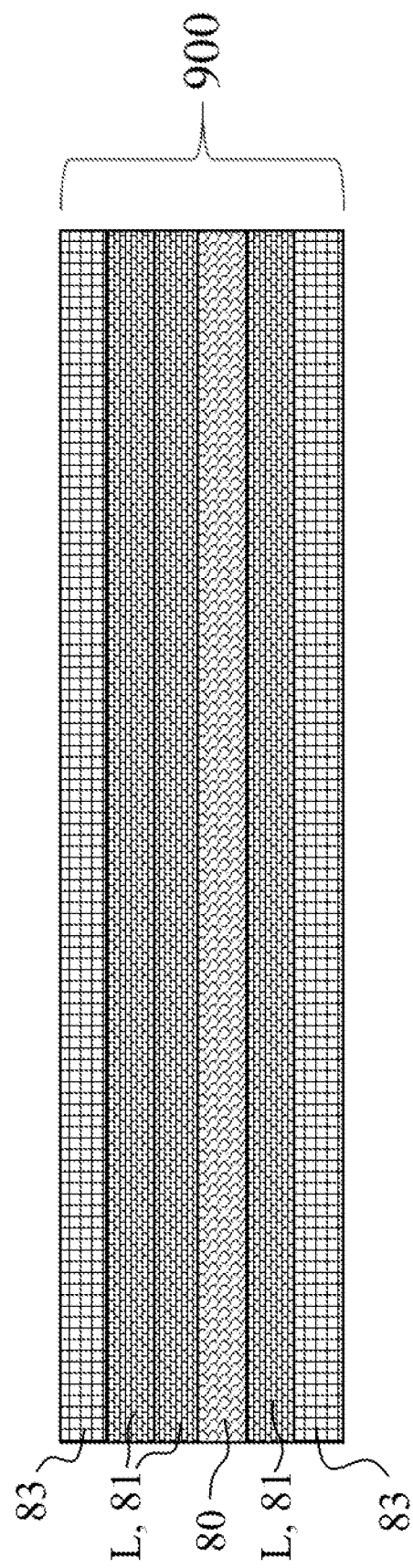
FIG. 11B illustrates a cross-section of layers forming a composite structure of natural materials, in accordance with aspects of the disclosure.

In accordance with another aspect, a carrier body 49'', as identified in FIG. 10, wherein the following discussion also applies to bodies 49, 49' of carrier 21 discussed above, with the same reference numerals used above being used here to discuss body 49'', can include a mesh 80 fixed to at least a portion of the body 49'', such that mesh 80 can be strategically located as desired, including throughout a portion or throughout the entirety of the body 49''. Mesh 80 can be sandwiched between a pair of mats, also referred to as layers (L) of natural fibrous material (NF'), as shown in FIG. 11, and then overmolded with binder material B, as discussed above for body 49, such that mesh 80 can be encapsulated by the natural fibrous material (NF') and binder material B of body 49'' between the opposite sides 60, 62 of body 49''; or mesh 80 can be laid on a side of the natural fibrous material (NF') and then overmolded with binder material B of body 49'', wherein mesh 80 is again encapsulated by binder material B of body 49''. Mesh 80 and mats may be formed from natural fibers, such as plant derived fibers or rock derived fibers. Prior to fixing mesh 80 to body 49'', mesh 80 can be coated with a binder, such as material B, to further enhance fixed mesh 80 on body 49''. Mesh 80 can also be bonded or fixed to one or both of the sides 60, 62 of body 49'', such as via a suitably adhesive or mechanical fixation mechanism, e.g. binder, stitching, staples, rivets, or the like. Alternatively, a process for forming the body 49'' may include first spraying or coating, or dipping the mats and/or mesh 80 with binder material B, then next layering the mats and mesh 80 such that the mesh 80 is sandwiched between a pair of mats, for forming a stack of layered natural fibrous material (NF'), as shown in FIG. 11, or in other words forming the body 49'' of at least one layer of non-synthetic material. Next the layered structure may be thermoset together by applying heat and pressure to activate the binder material B and form a hardened and rigid composite structure of layered natural fibrous material (NF') with in the mold structure as shown in FIGS. 4 and 4A, such that mesh 80 can be encapsulated by the natural fibrous material (NF') and binder material B of body 49'' between the opposite sides 60, 62 of body 49''. The binder material B acting as a thermoset resin, may connect or adhere together then mats, and any projecting natural fibers of the mats, together via passageways in the mesh 80, and/or may also connect or adhere the mats with the mesh 80, for example the subfilaments 86 of the mesh 80 may be adhered to the binder material B which is connected to the mats. As a result the binder material B may act as both an adhesive for the at least one layer, and also a sealant for the at least one layer which may result from a single step of processing the at least one layers before the step of thermosetting the at least one layers. Binder material B may be a thermoset resin. For example, binder material B may be a non-synthetic oil, such as castor oil or other type of plant based oil (e.g. vegetable based oil). Binder material B may be substantially a non-synthetic oil, such as a bio-based polyol, or may be a blend of a non-synthetic oil and other non-synthetic or synthetic additive, such as polyurethane. For example, binder material B may be a blend consisting of 60% castor oil. Polyurethane or epoxy may also be used as a binder material B while still providing a body 49'' substantially formed using renewable, non-man made, materials, such as plant material or rock material. Binder material B may be a plant based polyurethane material. FIG. 11B shows a cross-section of one possible arrangement of layers forming a composite structure 900 of natural materials, such as a layered natural fibrous material (NF') for providing an eco-friendly vehicle structure, such as may be used for a carrier as described herein. Such as structure may be used to form other vehicle structures, such as interior trim panels, baffles, paneling, floor boards, as well as exterior sheeting, without limitation. Composite structure 900 is illustratively show as having a mesh 80 as a core, where mesh is formed using a natural or plant based material. Provided on either side of the mesh 80 are layers L of non-synthetic material, such as renewable bast fiber 81, for example mats of jute as one possible example. Three layers of natural mats 81 are provided for example, but more or less may be provided. The three layers of natural mats 81 and the mesh 80 may be thermoset after having been coated, sprayed or dipped in a binder material, such as a plant based polyurethane, such that the plant based polyurethane seals the layers 81 and the mesh 80, but also bonds the mesh 80 and layers 81 together after the thermosetting process. Illustratively, a layer of plant based polyurethane 83 is shown as forming protective sealing layers on opposite sides of the structure 900.

Figure 12:
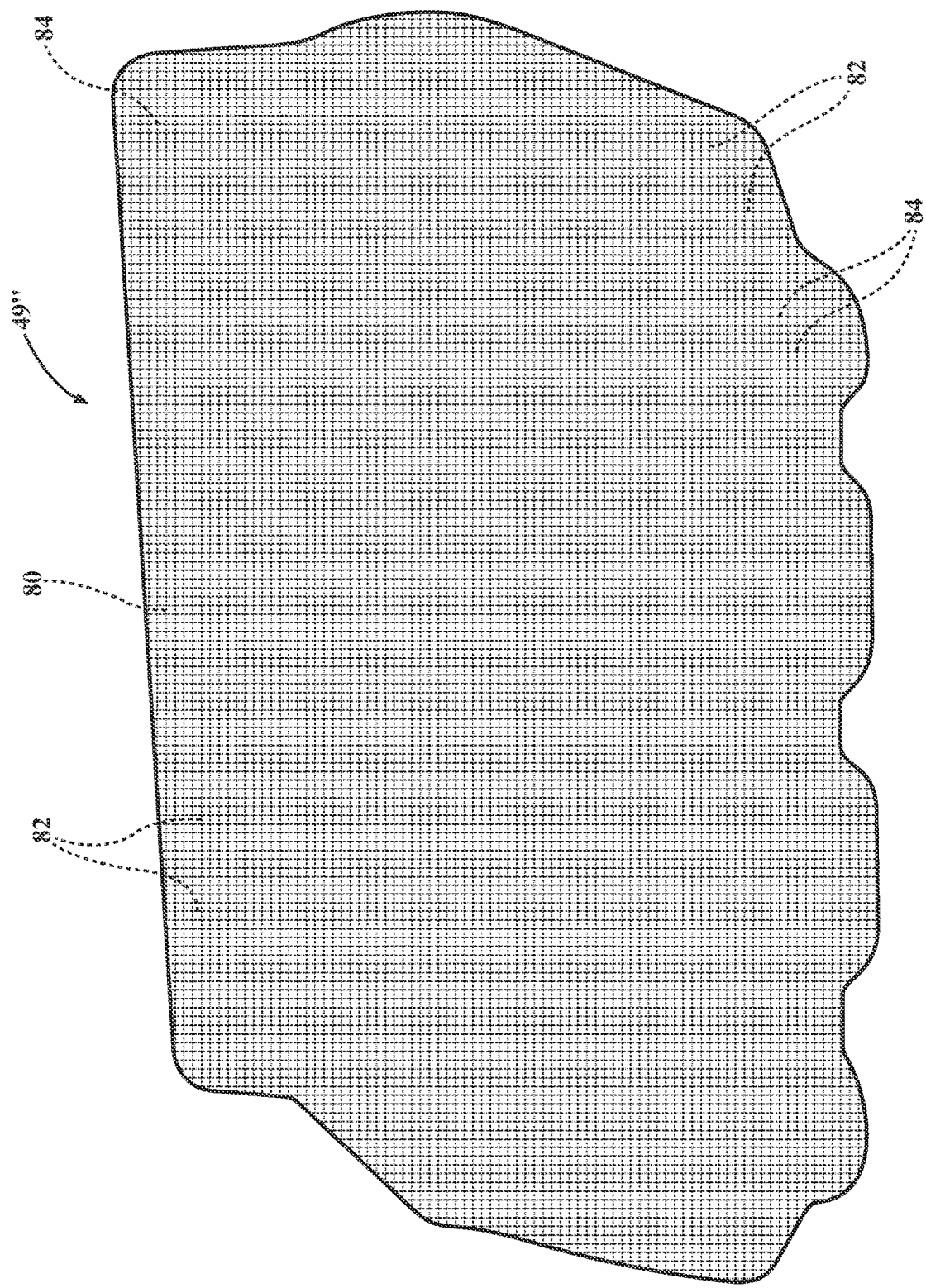
FIG. 12 is a schematic plan view of the carrier of FIG. 10.
Figure 13A:
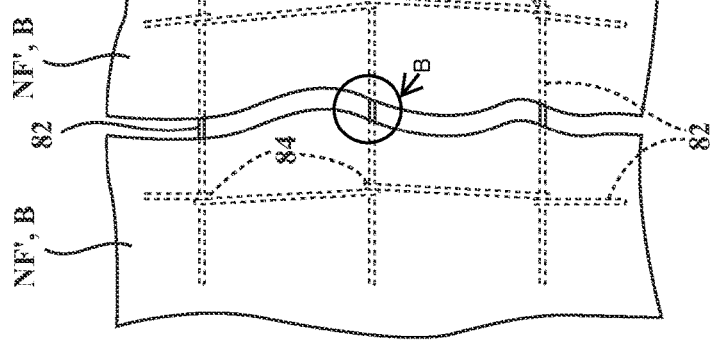
FIG. 13A is an enlarged, fragmentary plan view of the mesh of the carrier of FIG. 10 shown in the post-crash condition.
Figure 12B:
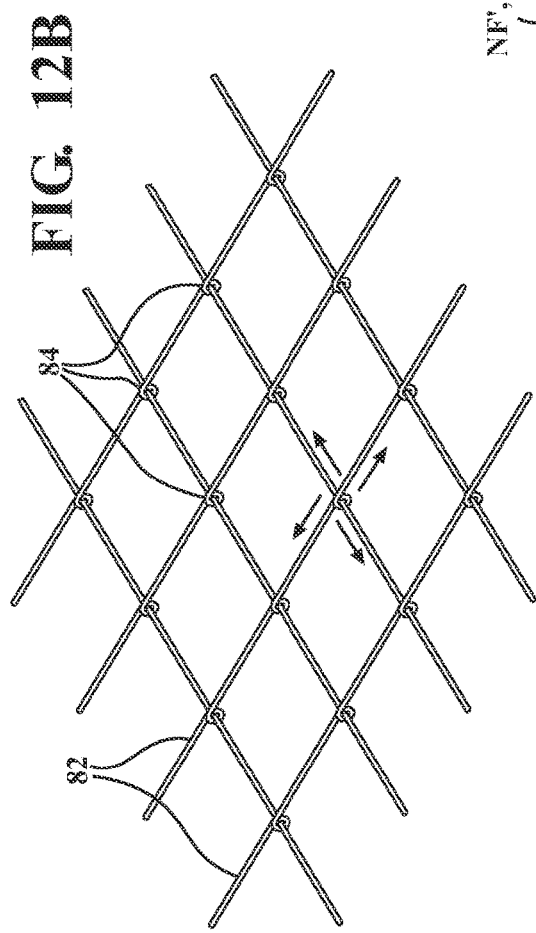
FIG. 12B is an enlarged, fragmentary perspective view of the mesh of FIG. 12A.
Figure 12A:
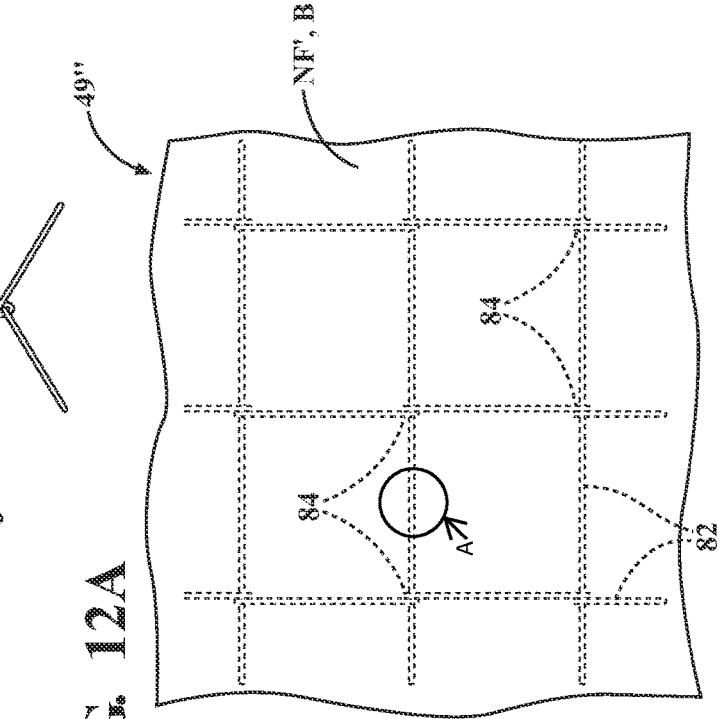
FIG. 12A is an enlarged, fragmentary plan view of a mesh of the carrier of FIG. 10 shown in an as manufactured, pre-crash condition.
Figure 13B:
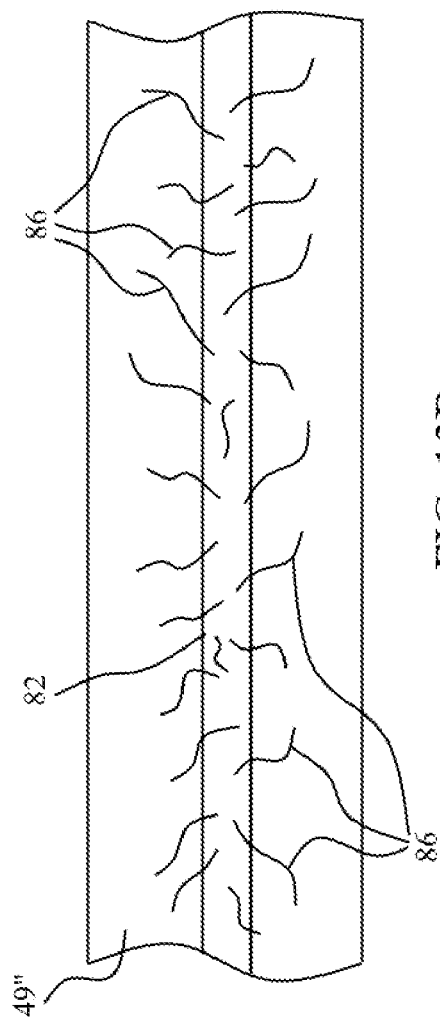
FIG. 13B is a cross-sectional close up view of area A showing a part of the mesh of FIG. 12A in a pre-crash condition.
Figure 13C:
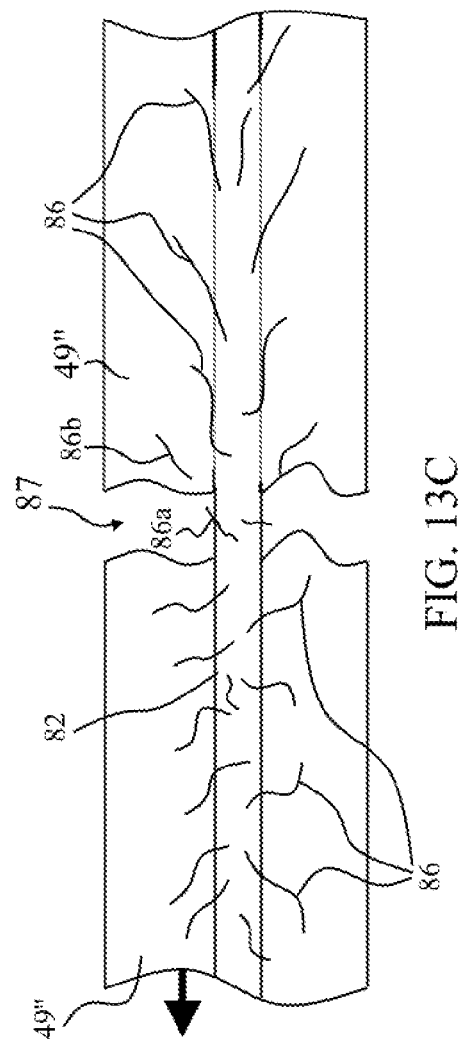
FIG. 13C is a cross-sectional close up view of area B showing a part of the mesh of FIG. 12A in a post-crash condition.
Figure 13:
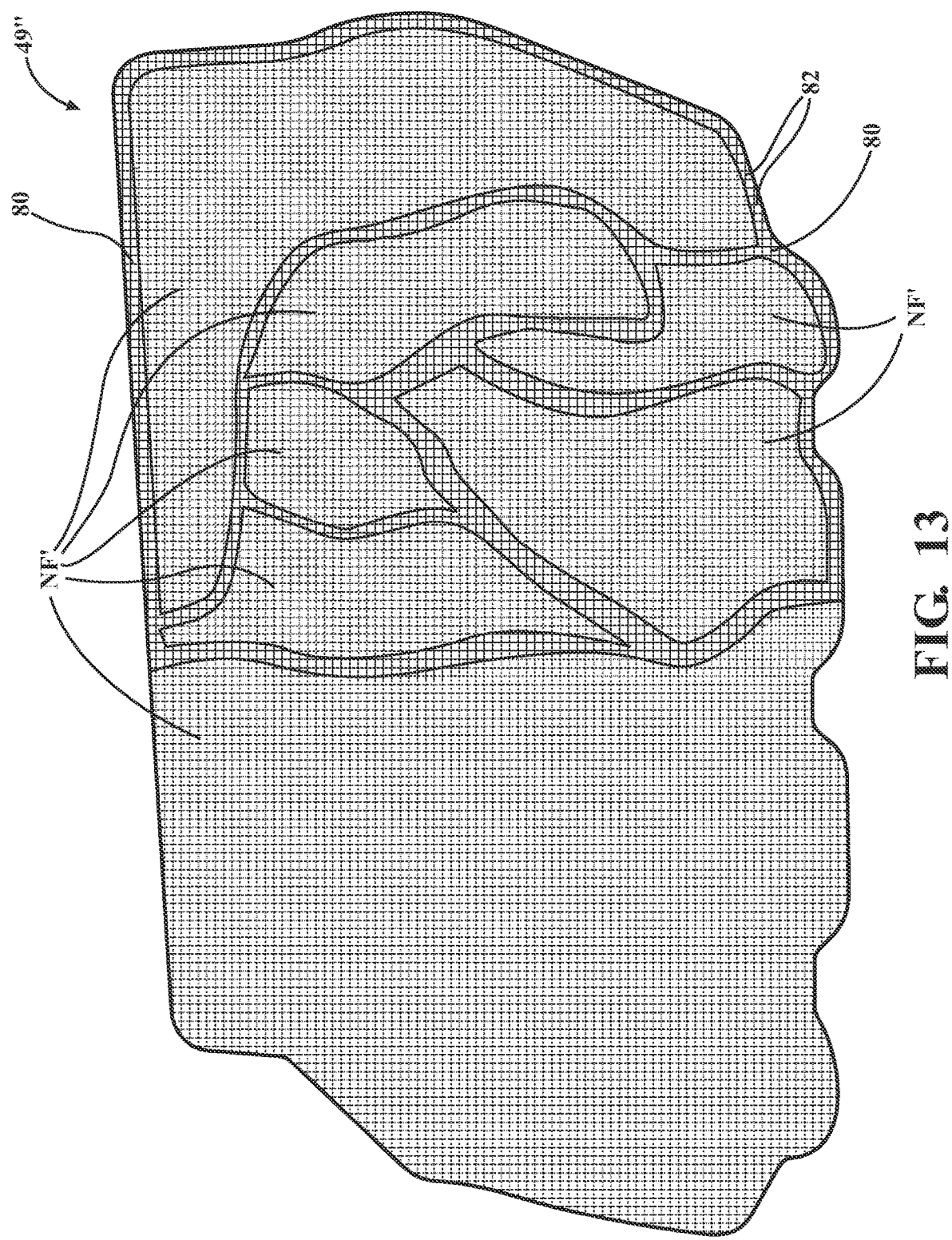
FIG. 13 is a view similar to FIG. 12 showing the carrier in a post-crash condition.

Mesh 80 is flexible to allow bending, expansion, and compression of body 49'', such as may occur in a crash condition, wherein mesh 80 functions to hold body 49'' together as a single piece of material, thereby preventing body 49'' from shattering and having a piece (fragment) or pieces (fragments) broken off therefrom (FIGS. 12 and 12A showing carrier 21 and body 49'' thereof prior to experiencing a crash condition and FIGS. 13 and 13A showing carrier 21 and body 49'' thereof after experiencing a crash condition). It is to be recognized that the material, such as the natural fibrous material (NF') of body 49'', may break to form separate pieces of the natural fibrous material (NF'), whereupon mesh 80 holds the separate pieces together. Alternatively, mesh 80 may be overmolded using thermoplastics and an injection molding process for forming the body 49''. Such flexibility, expansion, contraction of mesh 80 also facilitates construction of body 49'' by preventing the build-up of internal stresses within body 49'' during construction.

Figure 14:
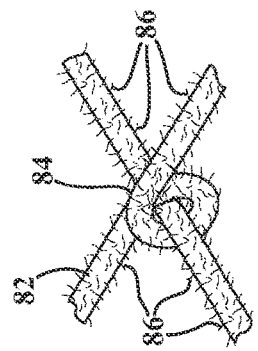
FIG. 14 is an enlarged, fragmentary view of the mesh of the carrier of FIG. 10 showing a node interconnecting filaments of the mesh with one another to allow relative, connected movement between the filaments during manufacture and during a crash condition and shown sub-filaments of the filaments to enhance bonding the mesh to a body of the carrier.

Mesh 80 can be formed from a non-synthetic material, such as a plant based material or a rock based material. Mesh 80 may be of a non-metallic material. Mesh 80 may of a non-plastic material. Mesh 80 can be formed including a plurality of filaments 82 interconnected with one another at nodes 84 (FIG. 14). The nodes 84 can be formed as loops of a filament(s) 82, such as formed via knit stitches, by way of example and without limitation, to allow the plurality of filaments 82 to shift and move relative to one another, such as during construction of body 49'' and as body 49'' is being flexed and bent during a crash condition, shown in FIG. 13A, as discussed above, thereby minimizing the build-up of internal stresses and providing a mechanism for energy dissipation, while maintaining the filaments 82 in interconnected relation to one another. Filaments 82 can be provided from any desired materials, including monofilaments and/or multifilaments of natural fibers, with the filaments 82 being woven or knitted with one another. Multifilaments can be formed from inorganic or organic materials as spun fibers of yarn, also referred to as thread, wherein the plurality of fibers within the multifilament provide a textured, non-smooth surface relative to a surface of a monofilament, that facilitates bonding of the filaments 82 to binder material B of body 49". As discussed above, to further enhance the bonding of the filaments 82 to the binder material B of body 49", the filaments 82 can be pre-coated with a binder material, including the same type of binder material B used to bond the natural fibrous material (NF') of body 49", by way of example and without limitation. To further facilitate bonding filaments 82 of the binder material B of body 49", filaments 82 can have a plurality of fingers or branches, also referred to as sub-filaments 86, extending radially outwardly from a main branch or body of the filaments 82 in random orientation to one another, with the sub-filaments 86 providing increased surface area of the filaments 82 and an increased number of attachment locations, thereby forming additional locations for fixing and anchoring filaments 82 to the binder material B of body 49".

As shown in FIG. 7, a method 1000 of manufacturing a carrier 21 of a carrier module 20 for a motor vehicle door panel structure 22 for closing off an opening 26 in an inner panel 18 of the motor vehicle door panel structure 22 is provided to keep moisture and fluid from passing from a wet side of carrier module 20 to a dry side of carrier module 20. The method 1000 includes a step 1100 of providing at least one mat of recyclable, natural fibrous material (NF'), wherein the natural fibrous material (NF') can be formed having an imperforate or perforate pattern, such as honeycomb, if desired. An optional step 1150 of providing a mesh 80, as discussed above, and either sandwiching the mesh 80 between a pair of the mats of the natural fibrous material (NF'), or non-synthetic material, or against a side of a mat of the natural fibrous material (NF'). Then, a step 1200 of adding a binder/resin material (B) to the recyclable, natural fibrous material (NF') is performed, such as via overmolding, spraying, or otherwise, to form a blank, also referred to as web, of the recyclable, natural fibrous material (NF') and the binder material (B). An optional step 1250 of applying a sealant material, as discussed above, to one or both of the sides 60, 62 of blank can be performed. Then, a step 1300 of disposing the blank between mold halves 66, 68 and compressing the blank between the mold halves 66, 68 under heat and pressure to provide the blank with the desired contour along the opposite sides 60, 62 of the finished carrier 21 is performed. Then, a step 1400 of inserting grommets, also referred to as reinforcement fasteners 76, into through openings, also referred to as attachment holes 74, and fixing the grommets 76 in through openings 74 is performed. An optional step 1450 of applying a sealant material, as discussed above, to one or both of the sides 60, 62 of blank can be performed to form a fluid impervious layer 72. Then, a step 1500 of assembling the carrier 21 to the inner panel 18 of door panel structure 22, with the fluid impervious layer 72 facing the wet side of the door panel structure 22.

Figure 8:
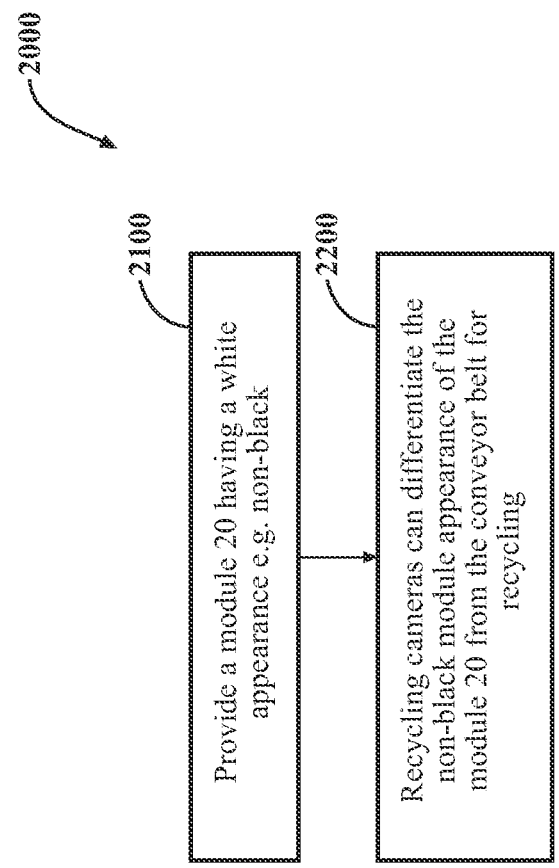
FIG. 8 is a flow diagram illustrating a method of facilitating the ability to recycle a recyclable carrier in accordance with another aspect of the disclosure.

In FIG. 8, a method 2000 of facilitating the sorting of a carrier 21 of a carrier assembly 20 in a recycling process is shown. Method 2000 includes a step 2100 of providing the carrier 21 with a non-black appearance, preferably on the wet side 60 of the carrier 21, and more preferably on both sides 60, 62 of the carrier 21. Further, as step 2200 of identifying the recyclable material of the carrier 21 with an optical sorting recycling camera in a sorting process by differentiating the non-black surface in contrast to an underlying black surface of a conveyor belt.

Figure 9:
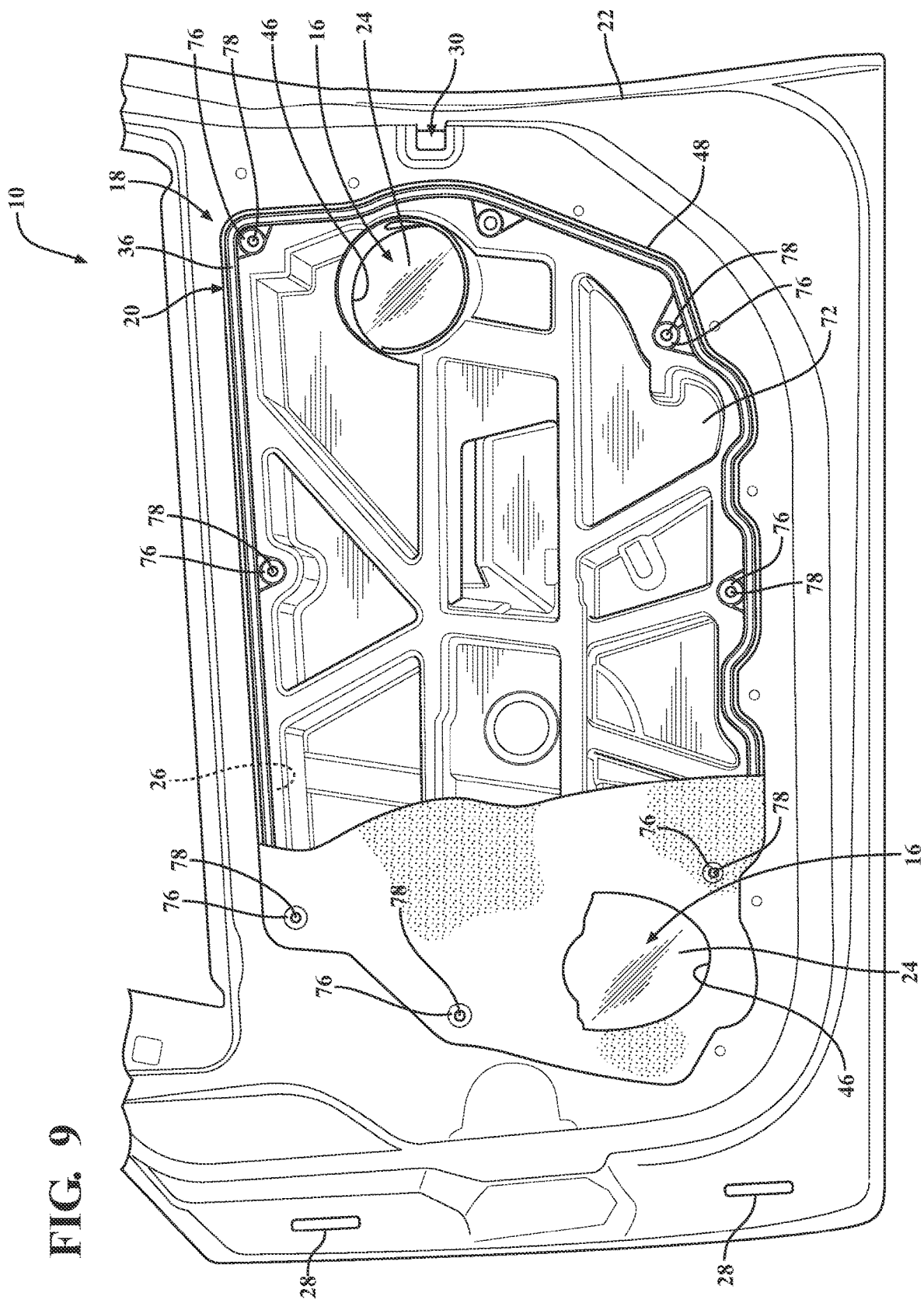
FIG. 9 is a barrier for a carrier formed using the teachings described herein.

FIG. 9 shows a barrier for a carrier module. The barrier is formed from a material that is water soluble such as a material composed of two parts consisting of a polymer which is soluble in water (e.g. Polivinilalcohol) and a structural component of cellulose fibers (30-60%). Such a material may provide to the barrier a structure that is low weight, low cost, provides noise insulation properties, provides high energy adsorption properties in case of side impact, and may have some flame resistance properties, if an additive is added to the polymer to achieve the flame resistance. Such a material is also 100% recyclable. The barrier may be formed by direct extrusion «dry blend» in different shapes including pellets (for injection molding), sheets (for thermoforming), filaments (for 3D prints). At the end of the product life of the barrier, if exposed to water, the polymer melts and the cellulose fiber are fully recyclable. A carrier structure as described herein may also be formed using such material. If needed for forming the barrier or the carrier, semifinished or sub-parts of the carrier or barrier can be made in different shapes and then subsequently assembled together to form the carrier or barrier using the bonding properties of the polymer which can be activated by water exposure. Therefore, even different parts with different density and mechanical properties can be optimized to achieve weight targets and wanted noise behavior. In a configuration of the carrier or barrier, an energy absorption structure can be integrated or added to the carrier or barrier. In specific areas where it is important to have high energy absorption, structures are placed similar to bird nest which will deform during impact dispersing high amount of energy. These energy absorbing structures are made by cellulose wire/foam covered by the polymer. This weaving is welded by addition of water which melts superficially the polymer and bonds the wires each others. or shaped foams.

As shown in FIG. 15, another method 3000 of manufacturing a carrier 21 of a carrier module 20 for a motor vehicle door panel structure 22 for closing off an opening 26 in an inner panel 18 of the motor vehicle door panel structure 22 is provided to keep moisture and fluid from passing from a wet side of carrier module 20 to a dry side of carrier module 20. The method 3000 includes a step 3100 of providing an interconnected structure, also referred to as grid or mesh 80. Then, optionally, a step 3200 includes coating the mesh 80 with a binder B, such as sold under the trademark ACRODUR®, by way of example and without limitation, which offers excellent strength, flexibility and versatility, and is a water-based, formaldehyde-free acrylic binder, thereby enabling safer, simpler and more ecological handling. And, optionally, a step 3300 includes overmolding the mesh 80 to form a body 49" of carrier 21. During the overmolding step 3300, the fibers of mesh 80 can self-adjust relative to one another to inhibit the build-up of internal stresses within body 49", thereby improving the ability to form carrier 21 having the desired shape, and further reducing the propensity to have cracking occur within body 49" during use and during a crash condition. As another option, a step 3400 includes combining mesh 80 with one or more additional sheets, also referred to as layers or mats, such as from the natural fibrous material NF discussed above, and molding the combined mesh 80 and layer(s) to form a composite carrier 21.

In FIG. 16, a flow diagram 4000 illustrates how a body 49" within carrier module 20 functions to maintain a carrier 21 of carrier module 20 as a single piece of material, regardless of body 49" becoming fractured in a crash condition. As shown in an initial, normal use condition of door module 20 at 4100, carrier 21 is in a pre-crash, as manufactured condition. Then, at 4200, an external crash force is encountered, causing body 49" of carrier 21 to become fractured. However, at 4300, it is detailed how a mesh 80 within body 49" tethers fractured pieces of body 49" together, thereby maintaining body 49" as a single piece of material (no pieces are permitted to separate free from body 49"). Further, an interconnecting structure of mesh 80 permits individual filaments, such as discussed above, within mesh 80 to shift and move relative to one another (FIG. 13A) to prevent the build-up of internal stresses within body 49", thus, preventing body 49" from overstrained and preventing the mesh 80 from fracturing. Accordingly, mesh 80 is able to perform its intended function to maintaining carrier 21 as a single component.

FIG. 13B shows a close up cross-sectional view of a portion of the body 49" in a pre-crash state. Body 49" is illustratively formed using overmolding process of thermoplastic material to embed the filaments 82 and the sub-filaments 86 in the thermoplastic when cooled. It is understood that filaments 82 and sub-filaments 86 may be connected to the other layers or mats of natural material using a binder material as described hereinabove. As a result the filaments 82 and the sub-filaments 86 are secured to the body 49" in a pre-crash condition. FIG. 13C shows a close up cross-sectional view of a portion of the body 49" in a post-crash state. Body 49" has illustratively undergone a deformation, such as a separation of the body 49" moving to the left as shown in FIG. 13C, such that a crack 87 has formed exposing part of the filament 82 during a crash or impact to the body 49". Separation of the body 49" may be allowed to a certain extend by at least one of a natural flex or stretch of the filament 82 formed from a natural material, or sliding of the filament 82 within the cavity formed to surround the filament 82 during overmolding for example. During a separation of the body 49" sub-filaments 86 may also be caused to at least one of stretch, flex, snap or slide. And example of a sub-filament 86 snapping is shown as two parts 86a, and 86b of the same sub-filament 86. Such stretching, flexing, snapping or sliding allows some energy to be expended during the impact or crash causing a separation of the body 49" while allowing the a separated body portions of body 49" to remain connected together.

While the above description constitutes a plurality of embodiments of the present invention, it will be appreciated that the present invention is subject to further modification and change without departing from the fair interpretation and intended meaning of the accompanying claims.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A carrier for a carrier module of a motor vehicle door assembly having an inner panel and an outer panel defining a door panel structure with the inner panel having an opening to an internal door cavity between the inner and outer panels, said carrier comprising:
   a body with opposite sides bounded by an outer periphery configured for attachment to the inner panel to substantially close off the opening, said body formed substantially entirely from non-synthetic material comprising natural fibers of natural fibrous materials.

2. The carrier of claim 1, wherein said body comprises at least one layer of non-synthetic material.

3. The carrier of claim 2, wherein said at least one layer of non-synthetic material is coated with a thermoset resin.

4. The carrier of claim 3, wherein the thermoset resin comprises a non-synthetic binder material.

5. The carrier of claim 2, wherein the at least one layer includes a mesh layer of non-synthetic material.

6. The carrier of claim 5, wherein said at least one layer includes a pair of mats of non-synthetic material, said mesh being sandwiched between said pair of mats.

7. The carrier of claim 6, wherein said mesh and said pair of mats are interconnected together by a thermoset resin.

8. The carrier of claim 7, wherein said mesh comprises a plurality of filaments have sub-filaments extending outwardly therefrom, said sub-filaments being bonded to said mats by the thermoset resin.

9. The carrier of claim 1, wherein said at least one layer is formed from a natural fibrous material derived from plants or rocks.

10. The carrier of claim 9, wherein said plant based material is bast fiber, and said rock based material is basalt fiber.

11. A carrier for a carrier module of a motor vehicle door assembly having inner and outer panels defining a door panel structure with the inner panel having an opening for selective access to an internal door cavity between the inner and outer panels, said carrier, comprising:
    a body with opposite sides bounded by an outer periphery configured for attachment to the inner panel to substantially close off the opening, said body formed including a mesh fixed thereto, said mesh preventing said body from breaking into separate pieces of material upon experiencing impact forces;
    wherein said body is formed as a thermoplastic overmolded with said mesh;
    wherein a mixture of natural fibers forms said mesh.

12. A carrier for a carrier module of a motor vehicle door assembly having inner and outer panels defining a door panel structure with the inner panel having an opening for selective access to an internal door cavity between the inner and outer panels, said carrier, comprising:
    a body with opposite sides bounded by an outer periphery configured for attachment to the inner panel to substantially close off the opening, said body formed including a mesh fixed thereto, said mesh preventing said body from breaking into separate pieces of material upon experiencing impact forces
    wherein said mesh includes a plurality of filaments interconnected with one another at nodes, said nodes allowing said plurality of filaments to move relative to one another while remaining interconnected to one another and with said body.

13. The carrier of claim 12, wherein said plurality of filaments have sub-filaments extending radially outwardly therefrom, said sub-filaments being bonded to said body.

14. The carrier of claim 13, wherein said plurality of filaments are formed from natural fibers.

15. A carrier for a carrier module of a motor vehicle door assembly having inner and outer panels defining a door panel structure with the inner panel having an opening for allowing access to an internal door cavity between the inner and outer panels, said carrier, comprising:

a body with opposite sides bounded by an outer periphery configured for attachment to the inner panel to substantially close off the opening, said body formed including a network of filaments, wherein the filaments include a plurality of sub-filaments extending outwardly from the filaments for encompassment by the body.

16. The carrier of claim 15, wherein the filaments and sub-filaments are formed from a natural fiber material.

17. The carrier of claim 15, wherein the body is formed including a network of filaments interconnected by a plurality of nodes, wherein the body, when in a non-crash state, prevents a shifting of the nodes relative to the filaments, and wherein the body, when in a crash state, allows a shifting of the nodes relative to the filaments.

18. The carrier of claim 17, wherein said body is formed including at least one mat having a mixture of natural fibers, said at least one mat and said network of filaments being overmolded with a binder material.

\* \* \* \* \*